(12) United States Patent
Amamori et al.

(10) Patent No.: US 6,409,209 B2
(45) Date of Patent: Jun. 25, 2002

(54) AIRBAG APPARATUS

(75) Inventors: Ichiro Amamori; Tadahiro Igawa, both of Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/835,850

(22) Filed: Apr. 17, 2001

(30) Foreign Application Priority Data

Apr. 21, 2000 (JP) ........................................ 2000-121333

(51) Int. Cl.⁷ .............................................. B60R 21/16
(52) U.S. Cl. .................... 280/728.2; 280/743.2
(58) Field of Search ..................... 280/728.2, 736, 280/741, 743.2

(56) References Cited

U.S. PATENT DOCUMENTS

| 4,810,005 | A | * | 3/1989 | Fohl |
| 4,913,461 | A | * | 4/1990 | Cuevas |
| 5,346,248 | A | * | 9/1994 | Rhein et al. |
| 5,425,548 | A | | 6/1995 | Rasmussen |
| 5,490,690 | A | * | 2/1996 | Mihm |
| 5,511,818 | A | * | 4/1996 | Jarboe et al. |
| 5,577,763 | A | * | 11/1996 | Cuevas |
| 6,042,147 | A | | 3/2000 | Nishijima et al. |
| 6,173,988 | B1 | * | 1/2001 | Igawa |
| 6,241,283 | B1 | * | 6/2001 | Zarazua |

FOREIGN PATENT DOCUMENTS

| JP | 2-164640 | 6/1990 |
| JP | 10-16694 | 1/1998 |
| JP | 10-71910 | 3/1998 |
| JP | 11-278189 | 10/1999 |

* cited by examiner

Primary Examiner—Brian L. Johnson
Assistant Examiner—Tony Winner
(74) Attorney, Agent, or Firm—Kanesaka & Takeuchi

(57) ABSTRACT

An airbag apparatus is formed of a base member, an airbag situated above the base member, an airbag-fitting member disposed on the base member to attach the airbag to the base member, an inflator for generating gas to inflate the airbag, and a module cover for covering the airbag in a folded condition. The inflator has a smooth side face without a projection projecting outwardly from the side face of the inflator, and is fixed to the base member by the airbag-fitting member. The inflator can be easily formed and attached to the base member.

9 Claims, 20 Drawing Sheets

AIRBAG APPARATUS

BACKGROUND OF THE INVENTION AND RELATED ART STATEMENT

The present invention relates to an airbag apparatus, and specifically, it relates to an airbag apparatus for a driver's seat. More particularly, it relates to an airbag apparatus having an improved inflator structure.

As is well known, an airbag apparatus for a driver's seat is arranged at the center in a steering wheel. When a vehicle encounters an emergency, such as a collision, an inflator is operated to inflate the airbag.

This airbag apparatus for a driver's seat generally comprises a plate base-member which is called a retainer, an inflator, an airbag, and a module cover, as main components. The center of the retainer is provided with an insertion hole for the inflator into which a proximal side of the inflator is inserted.

The inflator is provided with a flange-like fitting piece, which may be simply referred to as a flange below, projecting from the side face of the inflator for attaching and fixing the inflator to the retainer.

The flange abuts against the periphery of the inflator insertion hole. The inflator comprises a casing which is filled with a gas generant, and a gas outlet disposed on the outer peripheral surface in the head side of the inflator, wherein the gas generant is ignited by an igniter to generate gas which is ejected from the gas outlet.

The rear end of the airbag is provided with an opening which is superposed on the periphery of the inflator insertion hole. A ring-fitting member for fitting the airbag, which may be simply referred to as a ring below, is arranged so as to hold the periphery of the opening, and the ring is fixed thereto with bolts and nuts or rivets. The periphery of the opening in the airbag is clamped between the ring and the periphery of the inflator insertion hole in the retainer, so that the airbag is fixed to the retainer.

In such an airbag apparatus, the flange or fitting piece is indispensable for the inflator for fixing the inflator to the retainer. However, the flange is generally arranged to the side face of the inflator, etc., by welding, etc., so that the operation is complicated while manufacturing cost increases. In such an airbag apparatus, there may be a case in that the flange is omitted, and a holding member, such as a bracket, for holding the inflator is newly and additionally required instead of the flange. In this situation, with increasing the number of parts, assembling operation of the airbag apparatus becomes complicated, and thereby also increasing the manufacturing cost.

It is an object of the present invention to provide an airbag apparatus in which an inflator can be attached to a retainer by solving such conventional problems without arranging a new member for holding the inflator to the retainer even when using an inflator without a fitting piece, such as a flange.

Further objects and advantages of the invention will be apparent from the following description of the invention.

SUMMARY OF THE INVENTION

An airbag apparatus according to the present invention comprises a base member or retainer, an airbag attached to the base member by an airbag-fitting member, an inflator for generating gas so as to inflate the airbag, and a module cover for covering the folded airbag, wherein the inflator has a smooth side face without a fitting piece projecting from the side face of the inflator. The inflator is fixed to the base member by the airbag-fitting member.

In the airbag apparatus according to the present invention, even when using the inflator without the fitting piece to the retainer, the inflator can be fixed to the retainer by the airbag-fitting member together with the airbag. Therefore, the process for providing the inflator with the fitting piece, such as a flange, is eliminated, and moreover, it is not necessary to provide the inflator with a new holding member to the retainer instead of such a fitting piece, so that the cost can be reduced.

In the airbag apparatus according to the present invention, preferably, the airbag is arranged on the front face of the base member, and the base member has an accommodating area projecting rearward for accommodating the inflator, wherein the airbag-fitting member has a capping portion for holding the inflator around the front face of the inflator, and the inflator is accommodated in the accommodating area and fixed to the base member by being held by the capping portion.

By such a structure, in the airbag apparatus according to the present invention, even when using the inflator without the fitting piece to the retainer, the inflator can be securely and easily fixed to the retainer without the holding member to the retainer replacing the fitting piece.

In the airbag apparatus according to present invention, preferably, the airbag is arranged on the front face of the base member which is provided with an accommodating member attached thereto and protruding rearward from the base member for accommodating the inflator, and the airbag-fitting member may include the capping portion for holding the inflator around the front face of the inflator. In such a case, the inflator is fixed to the face member by being accommodated in the accommodating member and held by the capping portion.

By such a structure, as the retainer of an airbag apparatus according to the present invention, a conventional retainer without the accommodating area for the inflator and having only an opening for receiving the inflator can be used. That is, on the rear face of such a conventional retainer, an accommodating member for accommodating the inflator is attached from the opening, and on the front face of the retainer, the airbag-fitting member having the capping portion for holding the inflator around the front face of the inflator is arranged, so that the inflator without the fitting piece can be securely fixed to the retainer as described above. Therefore, even when a conventional retainer is used, the inflator having no fitting piece to the retainer in itself can be securely fixed to the retainer.

In the airbag apparatus described above, a switch may be further disposed between the front face of the inflator and the front face of the module cover, and the switch may be supported by the capping portion of the airbag-fitting member.

By such a structure, when the module cover is made from a synthetic resin which is elastically deformable by pressing the front face thereof, for example, and when the switch, such as a horn switch, which is operable by pressing the front face of the module cover, is arranged between the front face of the inflator and the front face of the module cover, the switch can be supported by the capping portion of the airbag-fitting member, thereby improving the operability and the operating feeling of the switch.

In the airbag apparatus according to the present invention, the airbag-fitting member may be preferably connected to the front face of the airbag via a strap. In the airbag apparatus formed in such a manner, the strap is arranged such that one end of the strap is connected to the front face of the airbag along the peripheral face of the airbag while the other end is connected to the airbag-fitting member within the airbag. Therefore, the strap becomes restraining means for restraining the airbag configuration during inflation when the airbag is inflated by the gas ejection from the inflator.

That is, the strap has a predetermined length, and the front face of the airbag which is connected to the airbag-fitting member by the strap can not be separated therefrom by the strap for more than a predetermined distance when the airbag is inflated. Therefore, when the inflator is operated so as to eject gas and inflate the airbag in a vehicle cabin upon an emergency, such as a vehicle collision, the front face of the airbag can not be inflated over a predetermined amount, so that the side of the airbag is largely inflated outside the steering wheel due to a gas pressure, enabling a driver to be securely protected.

In the airbag apparatus according to the present invention, the module cover or an emblem may be attached to the front face of the airbag and the module cover or the emblem may be connected to the airbag-fitting member by a strap.

In this case, the module cover or the emblem is attached on the front face of the airbag along the external peripheral surface of the airbag, and on the front face of the airbag, an insertion hole for insertion of the strap is formed. One end of the strap inserted into the insertion hole is connected to the module cover or the emblem while the other end is connected to the airbag-fitting member within the airbag.

In the airbag apparatus formed in such a manner, when the airbag is inflated, the module cover or the emblem attached on the front face of the airbag moves toward a driver following the inflation of the airbag and the movement is stopped by the strap after a predetermined movement. Therefore, in the airbag apparatus formed in such a manner, the inflation of the front face of the airbag is restrained and the sides of the airbag are largely inflated outside the steering wheel due to a gas pressure, enabling the driver to be securely protected.

DETAILED DESCRIPTION OF PREFERRED EMBODIMENTS

Embodiments of the present invention will be described below with reference to the drawings.

Figure 1:
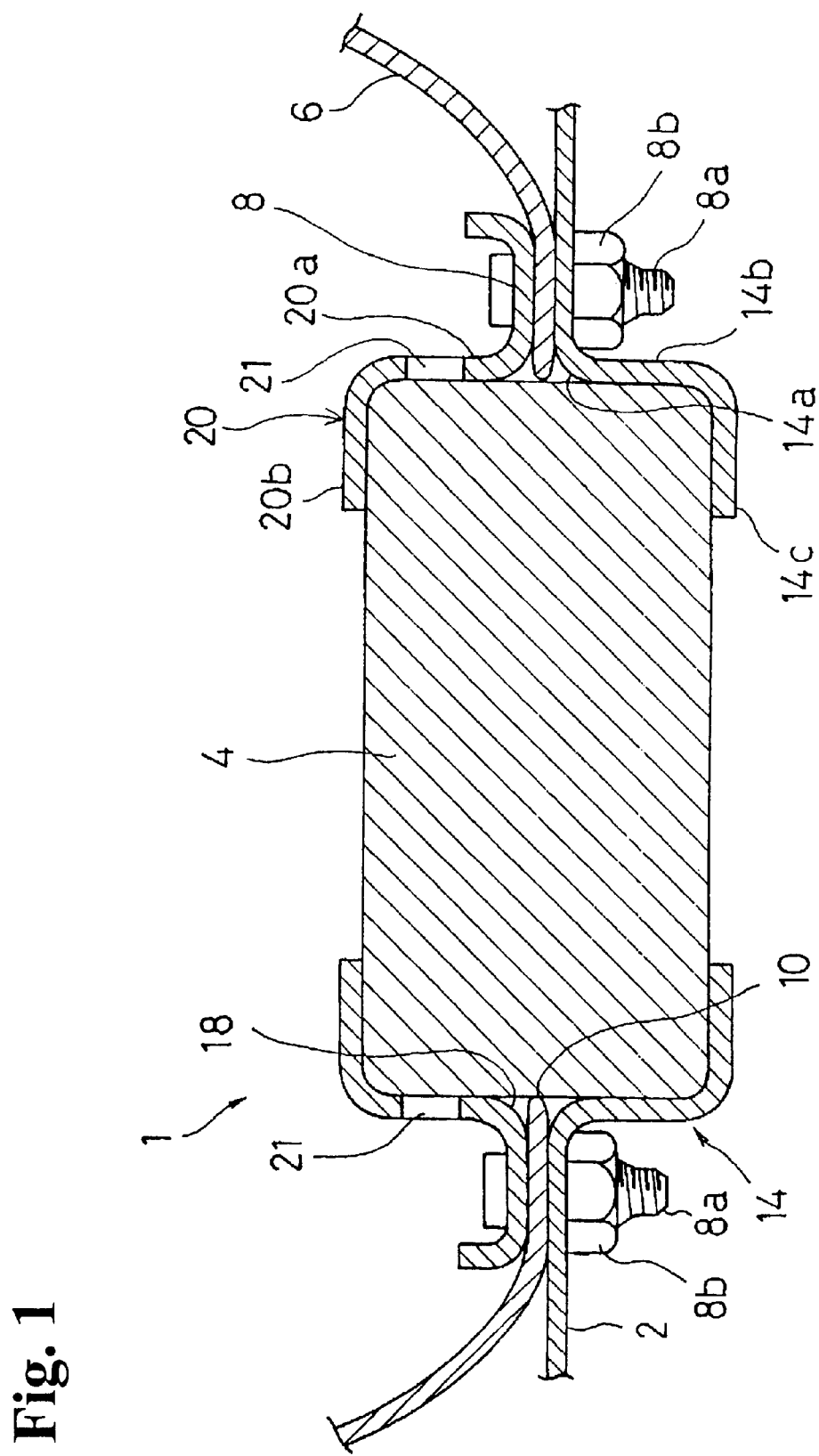
FIG. 1 is a sectional view of a principal part of an airbag apparatus according to an embodiment of the present invention.
Figure 2:
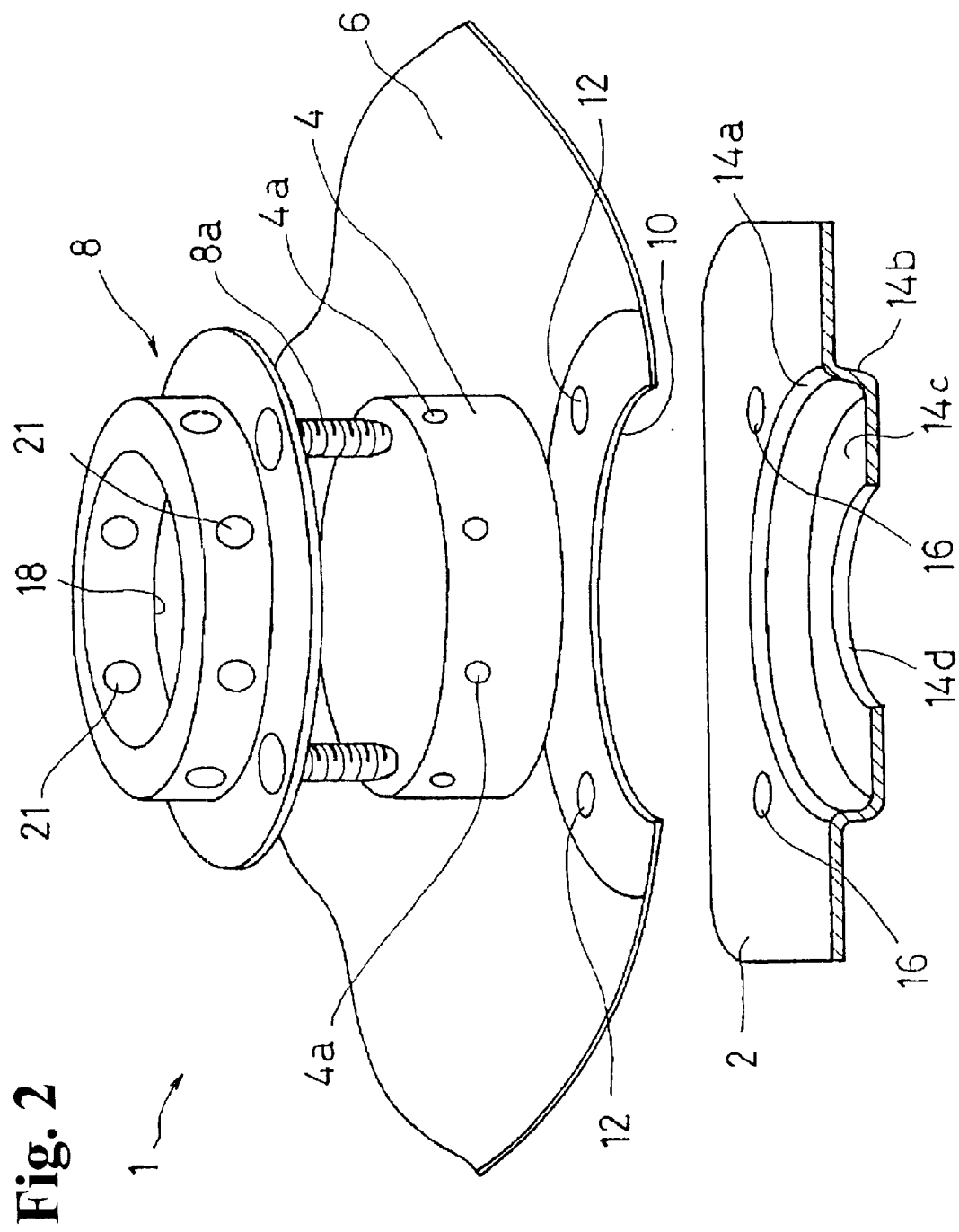
FIG. 2 is an assembly view showing the structure of a principal part of the airbag apparatus shown in FIG. 1.

FIG. 1 is a sectional view of an essential part of an airbag apparatus according to an embodiment of the present invention, and FIG. 2 is an assembly view showing the structure of a principal part of the airbag apparatus.

The airbag apparatus 1 comprises a plate base-member 2, which may be referred to as a "retainer" below, an inflator 4, an airbag 6, and an airbag-fitting member 8 for fitting the airbag 6 to the retainer 2.

The inflator 4 has a smooth side face without a fitting piece, such as a flange, projecting from the side surface of the inflator for attaching the inflator to the retainer. The front-half side, i.e. occupant side (the direction toward occupant may be referred to as "front" while the opposite direction may be referred to as "rear") of the inflator 4 is a gas injecting section for ejecting gas so as to inflate the airbag 6. Although not shown in the drawings, the inflator 4 is connected to a control device with a connector, etc., so that in an emergency, such as a vehicle collision, the inflator 4 is operated by an operating signal from the control device so as to eject gas, and thereby inflating the airbag 6.

The airbag 6 is provided with an opening 10 at the rear end thereof for receiving the gas ejecting section of the inflator 4 therein. The airbag 6 is used for a driver's seat and is formed by stitching the peripheries of the front surface thereof (not shown) made of a circular cloth and the rear surface thereof (not shown) made of a circular cloth together. In the circumference of the opening 10 of the airbag 6, arranged are plural insertion holes 12 for receiving bolts or rivets for fitting the airbag 6 to the retainer 2.

In the airbag 6 on the front face side of the retainer 2, the periphery of the opening 10 is superposed on the circumference of an opening 14a of an inflator-reception area 14, which will be described later, of the retainer 2. The airbag-fitting member 8 is arranged along the inner surface of the airbag 6 so as to hold the periphery of the opening 10. The periphery of the opening 10 in the airbag 6 is clamped between the airbag-fitting member 8 and the periphery of the opening 14a in the retainer 2, so that the airbag 6 is fixed to the retainer 2. In addition, in the embodiment, the airbag-fitting member 8 is provided with male-screws 8a. These male-screws 8a are inserted into the insertion holes 12 of the airbag 6 and into insertion holes 16, which will be described later, of the retainer 2, so that the airbag-fitting member 8 is fixed to the retainer 2 by fastening nuts 8b to the male-screws 8a from the rear surface of the retainer 2.

As shown in FIG. 1, the retainer 2 is provided with the inflator-reception area 14 projecting toward the rear of the retainer 2 for receiving the rear half of the inflator 2. The inflator-reception area 14 is formed of the opening 14a for receiving the inflator 4 and disposed in the retainer 2, a substantially cylindrical peripheral wall 14b extending from the marginal area of the opening 14a toward the rear of the retainer 2, and an inward flange 14c disposed in the rear end of the peripheral wall 14b. The lower half of the inflator 4 is inserted into the inflator-reception area 14 from the opening 14a, and the inflator 4 is detachably supported by the peripheral wall 14b extending along the side face of the inflator 4 and the inward flange 14c around the rear face of the inflator 4. At this time, an opening 14d surrounded by the inward flange 14c disposed in the rear of the reception area 14 is a connector-pulling-out opening for allowing the above-mentioned connector connecting the inflator 4 to the inflator control device to pass therethrough. On the fringe of the opening 14a of the retainer 2, formed are insertion holes 16 for bolts or rivets just like the insertion holes 12 of the airbag 6. In addition, in the embodiment, the retainer 2 is made from a steel plate to have a plate shape, and the reception area 14 is formed integrally with the retainer 2 by press forming or the like.

The airbag-fitting member 8 comprises an opening 18 for insertion of the inflator 4 and has a ring-shaped external appearance overlapping the fringe of the opening 10 from the inside of the airbag 6. The airbag-fitting member 8 holds the fringe of the opening 10 from the inner side of the airbag 6, and the fringe of the opening 10 is clamped between the airbag-fitting member 8 and the periphery of the opening 14a in the retainer 2, so that the airbag 6 is fixed to the retainer 2.

As mentioned above, the airbag-fitting member 8 is provided with the plural male-screws 8a extending rearward from the fringe of the opening 18. The airbag-fitting member 8 is arranged so that when it overlaps the fringe of the opening 10 in the airbag 6, the male-screws 8a are inserted into the insertion holes 12 of the airbag 6 and into the insertion holes 16 of the retainer 2. By fastening the nuts 8b to the male-screws 8a protruding toward the rear face of the retainer 2 by insertion into the insertion holes 12 and 16, both the male-screws 8a and the airbag 6 are securely fixed to the retainer 2.

The airbag-fitting member 8 is also provided with a capping portion 20 for holding the front surface of the inflator 4 accommodated in the inflator-reception area 14 of the retainer 2 when the airbag-fitting member 8 is attached to the retainer 2. This capping portion 20 comprises a substantially cylindrical peripheral wall 20a extending forwardly from the fringe of the opening 18, and an inward flange 20b formed so as to hold the front face of the inflator 4 by extending to the front face of the inflator 4 in the tip end of the peripheral wall 20a. When the airbag-fitting member 8 is attached to the retainer 2, a gas ejection part in the front half of the inflator 4 is inserted into the opening 18 of the airbag-fitting member 8, and the inflator 4 accommodated in the inflator-reception area 14 of the retainer 2 can not slip out of the reception area 14 by the peripheral wall 20a extending along the side face of the inflator 4 and the inward flange 20b for holding the front face of the inflator 4. In addition, the peripheral wall 20a is provided with gas introduction holes 21 at positions overlapping the gas injection holes 4a arranged on the side face of the gas injection part of the inflator 4 for introducing the gas ejected from the gas ejection holes 4a into the airbag 6.

When assembling the airbag apparatus 1, first, the airbag 6 is arranged on the front face of the retainer 2 so that the fringe of the opening 10 at the rear end of the airbag 6 overlaps the fringe of the opening 14a in the retainer 2. At this time, the rear half of the inflator 4 is accommodated into the inflator-reception area 14 of the retainer 2. The gas ejection part in the front half of the inflator 4 is introduced in the airbag 6 from the opening 10 of the airbag 6, and the connector (not shown) for connecting between the inflator 4 and the inflator control device is pulled out of the opening 14d at the rear end of the reception area 14.

Next, the airbag-fitting member 8 is overlapped with the fringe of the opening 10 in the airbag 6 from the inside of the airbag 6 so as to hold the fringe. At this time, the gas ejection part of the inflator 4 is inserted into the opening 18 of the airbag-fitting member 8 so that the front face of the inflator 4 is held by the capping portion 20 of the airbag-fitting member 8. The male-screws 8a of the airbag-fitting member 8 are inserted into the respective insertion holes 12 and 16 of the airbag 6 and the retainer 2, and the nuts 8b are fastened to the male-screws 8a projecting from the rear face of the retainer 2 from the tip ends of the male-screws 8a. Therefore, the airbag 6 and the airbag-fitting member 8 are fixed to the retainer 2.

Then, the airbag 6 is folded, and the airbag apparatus 1 is completed by arranging a module cover (not shown) on the front face of the airbag 6.

This airbag apparatus 1 is used for a driver's seat of an automobile and placed in a steering wheel (not shown) of the automobile, etc. In an emergency, such as a vehicle collision, the inflator 4 of the airbag apparatus 1 is operated so as to eject gas which is introduced into the airbag 6 via the gas introduction holes 21 of the airbag-fitting member 8 so as to initiate the inflation of the airbag 6. Then, the airbag 6 pushes the front module cover to open and spreads out in a vehicle cabin so as to protect the driver.

In the airbag apparatus 1 formed as above, since the inflator 4 is held by the reception area 14 of the retainer 2 and the capping portion 20 of the airbag-fitting member 8, even when the inflator 4 itself is not provided with a fitting piece to the retainer 2 just like in the embodiment, the inflator can be securely fixed to the retainer without using a separate holding member for fixing the inflator to the retainer, so that the construction and assembling of the airbag apparatus 1 are simplified to enable the manufacturing cost to be suppressed.

Figure 3:
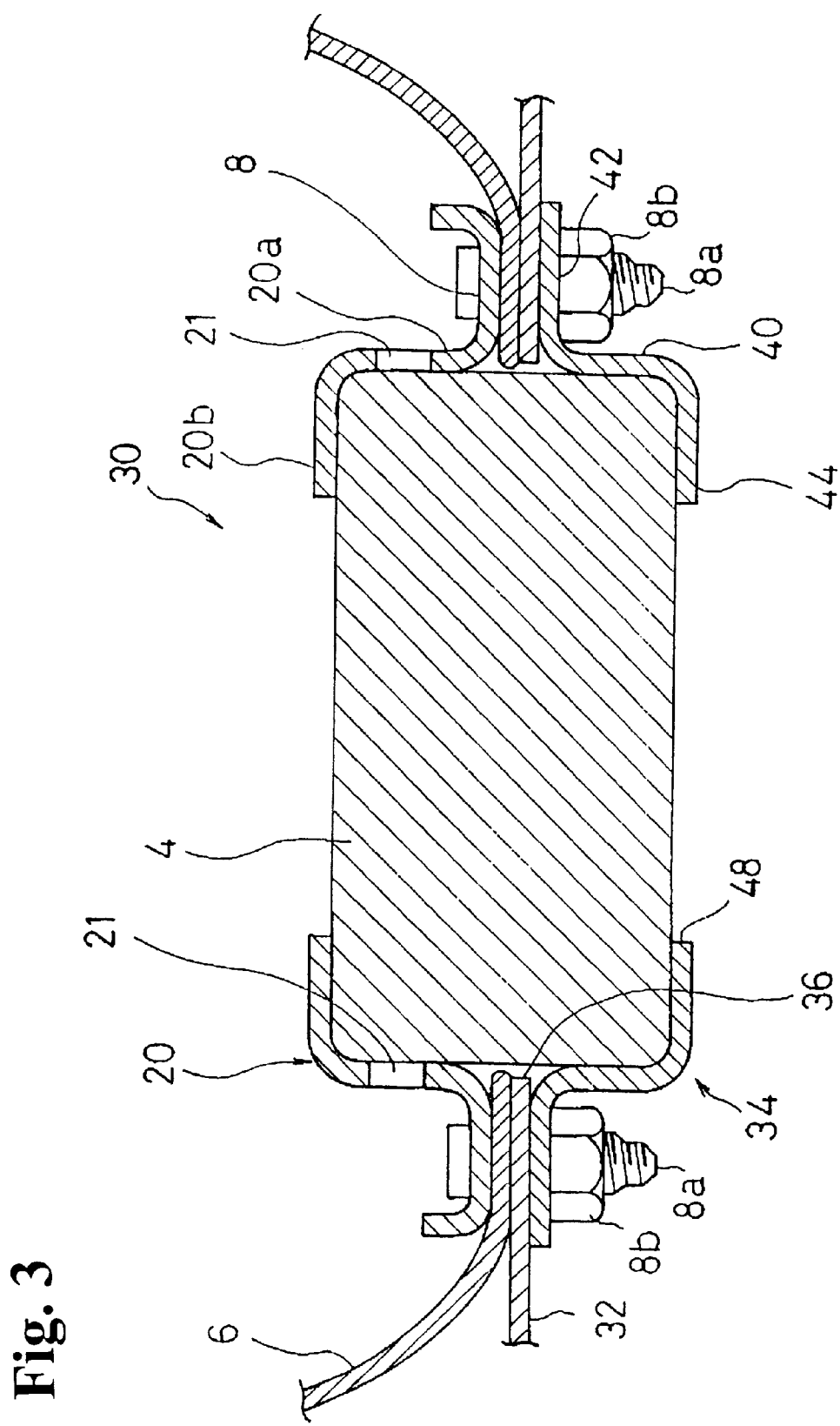
FIG. 3 is a sectional view showing the structure of a principal part of the airbag apparatus according to a second embodiment of the present invention.

In addition, in the embodiment described above, the reception area is formed integrally with the retainer 2, but it is not limited to this structure, and the reception area 14 may be formed separately from the retainer. By such a structure, an inflator without a fitting piece to the retainer can be fixed to the retainer even when, for example, using a conventional plate-shaped retainer without a reception area for the inflator. An embodiment of an airbag apparatus having such a structure will be described below with reference to FIG. 3. FIG. 3 is a sectional view of an essential part of the airbag apparatus according to this embodiment.

As shown in FIG. 3, an airbag apparatus 30 comprises a plate-shaped retainer 32 and an inflator-accommodating member 34 formed separately from the retainer 32 for accommodating an inflator therein.

The retainer 32 has a structure similar to a retainer used in a conventional airbag apparatus, and is provided with an opening 36 for receiving the inflator at the center of the retainer 32, and insertion holes 38 (not shown) for bolts or rivets formed in the periphery of the opening 36 just like the insertion holes 16 of the retainer 2 in the airbag apparatus 1.

The inflator-accommodating member 34 has substantially the same inner diameter as that of the opening 36 of the retainer 32, and comprises a substantially cylindrical peripheral wall 40 for receiving the rear half of the inflator 4, an outward flange 42 extending from the tip end of the peripheral wall 40 to overlap the fringe of the opening 36 of the retainer 32 from the rear side of the retainer 32, and an inward flange 44 extending from the rear end of the peripheral wall 40 toward the inner side of the peripheral wall 40. The accommodating member 34 is arranged so that the outward flange 42 overlaps the fringe of the opening 36 in the retainer 32, and the opening 36 and the peripheral wall 40 are substantially coaxially communicated with each other. The outward flange 42 is provided with insertion holes 46 (not shown) for receiving bolts or rivets just like in the insertion holes 38 of the retainer 32, and the accommodating member 34 is arranged so that the insertion holes 38 are overlaid on the insertion holes 46.

For the accommodating member 34 arranged in such a manner, the inflator 4 is inserted inside the peripheral wall 40 of the accommodating member 34 from the opening 36 of the retainer 32, and is detachably supported by the peripheral wall 40 and the inward flange 44 extending around the rear face of the inflator 4, to thereby be accommodated in the accommodating member 34. An opening 48 surrounded by the inward flange 44 at the rear end of the accommodating member 34 is a connector-pulling-out opening for receiving a connector (not shown) connecting the inflator 4 to an inflator control device (not shown).

The other structures of the airbag apparatus 30 are identical with those of the above-described airbag apparatus 1, and like references designate like portions.

When constructing the airbag apparatus 30, just like the airbag apparatus 1 described above, the airbag 6 is placed in the front side of the retainer 32 so that the fringe of the opening 10 in the rear end of the airbag 6 overlaps the fringe of the opening 36 in the retainer 32. At this time, in the rear face side of the retainer 32, the fringe of the opening 36 is overlaid on the outward flange 42 while the accommodating member 34 is arranged so that the opening 36 and the peripheral wall 40 are coaxially communicated with each other. The rear half of the inflator 4 is accommodated into the accommodating member 34 from the opening 36, and the gas ejection part in the front half of the inflator 4 is introduced in the airbag 6 from the opening 10 of the airbag 6.

The connector (not shown) for connecting between the inflator 4 and the inflator control device is pulled out of the opening 48 in the rear end of the accommodating member 34.

Next, the airbag-fitting member 8 is overlapped with the fringe of the opening 10 in the airbag 6 from the inner side of the airbag 6 so as to hold the fringe. At this time, the gas ejection part of the inflator 4 is inserted into the opening 18 of the airbag-fitting member 8 so that the front face of the inflator 4 is held by the capping portion 20 of the airbag-fitting member 8. The male-screws 8a of the airbag-fitting member 8 are inserted into the respective insertion holes 12, 38 and 46 of the airbag 6, the retainer 32 and the accommodating member 34, and the nuts 8b are fastened to the male-screws 8a projecting from the rear face of the outward flange 42 of the accommodating member 34 from the tip end of the male-screws 8a. Therefore, the airbag 6, the airbag-fitting member 8, and the accommodating member 34 are fixed to the retainer 32.

Then, the airbag 6 is folded, and the airbag apparatus 30 is constructed by arranging a module cover (not shown) on the front face of the airbag 6 so as to cover the folded airbag 6.

Also, in the airbag apparatus 30 formed as above, since the inflator 4 is held by the accommodating member 34 attached to the retainer 32 and the capping portion 20 of the airbag-fitting member 8, the inflator 4 can be securely fixed to the retainer 32 without necessity for arranging a fitting piece for the retainer 32 to the inflator 4. Moreover, by separating the retainer from the accommodating member for the inflator, a retainer used in a conventional airbag apparatus can be used as the retainer.

In these embodiments, the airbag-fitting member is provided with male-screws. After the male-screws are inserted into the insertion holes formed in the airbag, the retainer, the accommodating member and the like, the accommodating member is fixed to the retainer by fastening the nuts to the male-screws from the rear surface of the retainer or the accommodating member. However, means for fixing the airbag-fitting member to the retainer are not limited to this.

Figure 6:
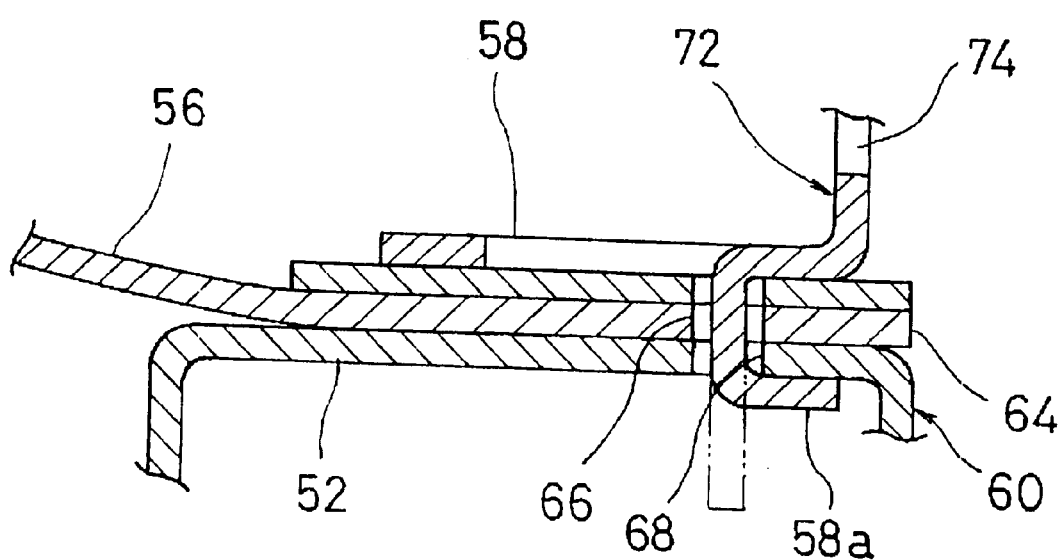
FIG. 6 is an enlarged view of a part 6 in FIG. 5.
Figure 7:
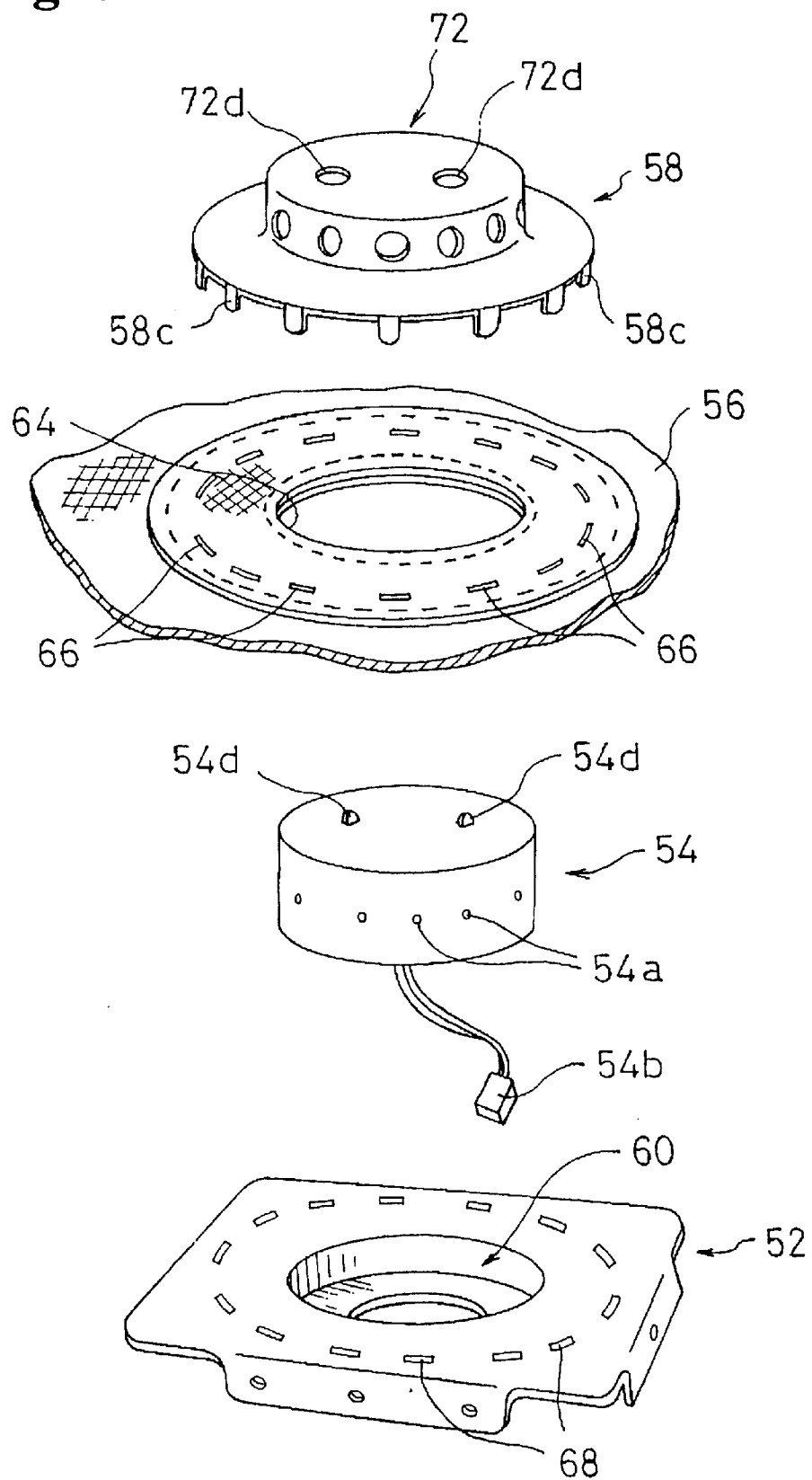
FIG. 7 is an assembly view showing the structure of a principal part of the airbag apparatus according to a fourth embodiment of the present invention.
Figure 8:
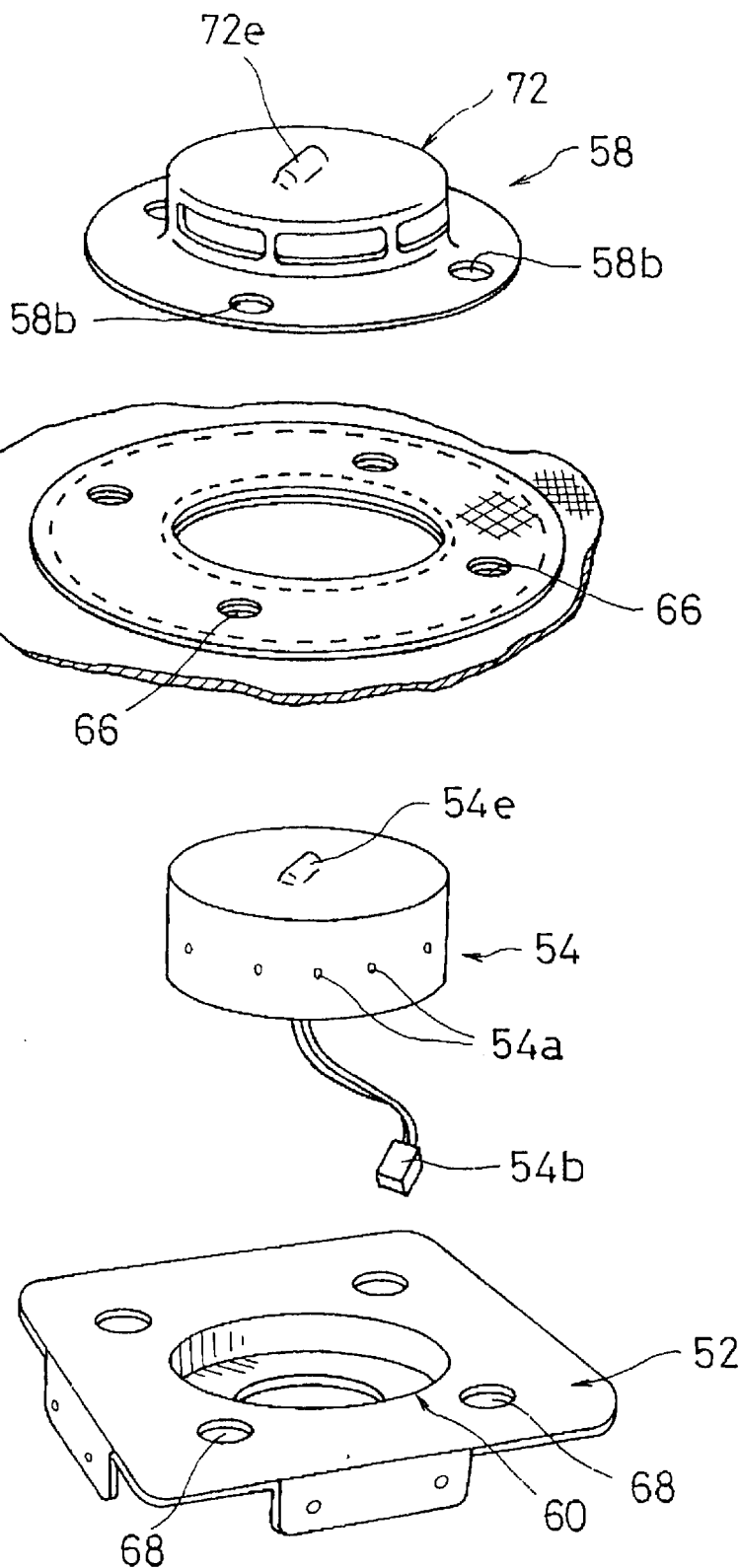
FIG. 8 is an assembly view showing the structure of a principal part of the airbag apparatus according to a fifth embodiment of the present invention.

For example, as shown in FIGS. 4 to 7, the airbag-fitting member is provided with claws extending toward the rear thereof while slit insertion holes for insertion of these claws are formed in the airbag and the retainer. Also, the airbag-fitting member may be fixed to the retainer by bending the claws protruding from the rear face of the retainer after inserting the claws into the respective insertion holes of the airbag and the retainer. Also, as shown in FIG. 8, insertion holes for insertion of bolts or rivets are formed in the airbag-fitting member, the airbag and the retainer, and fringes of the openings of the airbag-fitting member, the airbag, and the retainer are overlaid on each other. Then, the airbag-fitting member, the airbag, and the retainer may be integrally fixed by inserting the bolts or the rivets into the respective inserting holes.

In order to prevent the inflator from irregularly rotating or shifting from a predetermined position, positioning means for the inflator may be provided, and the gas introduction hole formed in the airbag-fitting member may have an arbitrary shape.

Referring to FIGS. 4 to 9, an airbag apparatus having such a structure will be described below.

Figure 4:
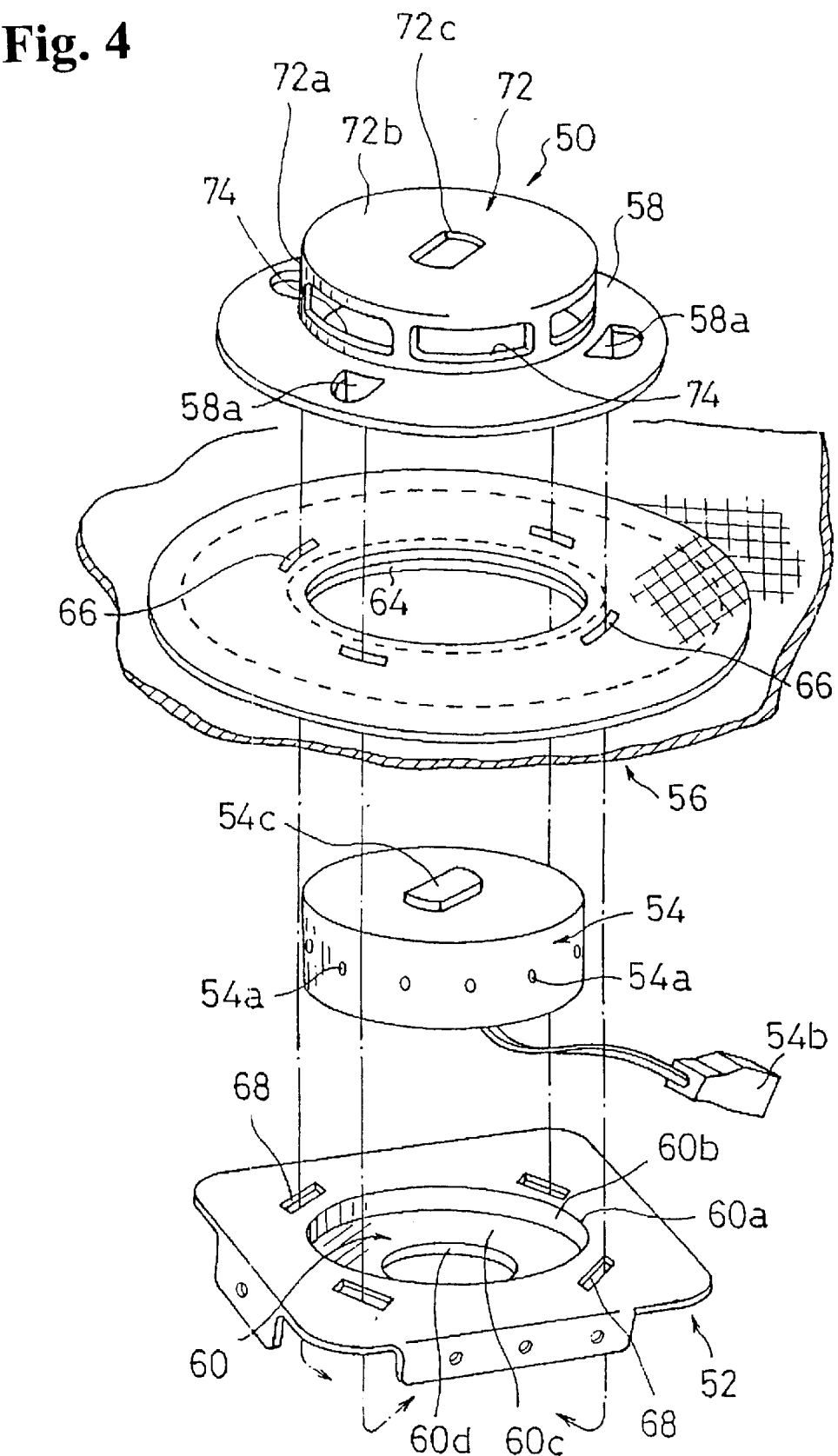
FIG. 4 is an assembly view showing the structure of a principal part of the airbag apparatus according to a third embodiment of the present invention.
Figure 5:
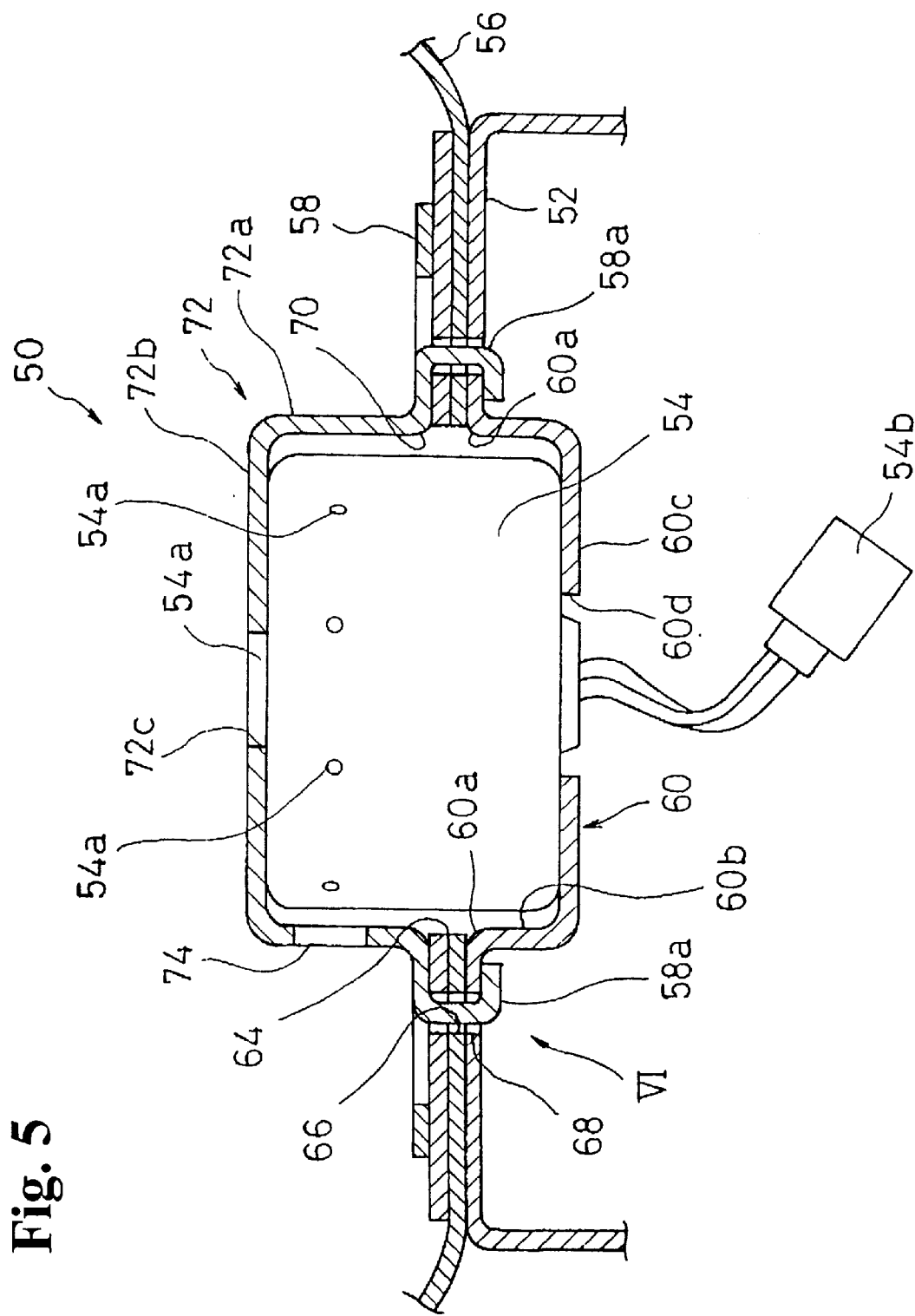
FIG. 5 is a sectional view showing the structure of a principal part of the airbag apparatus shown in FIG. 4.
Figure 9:
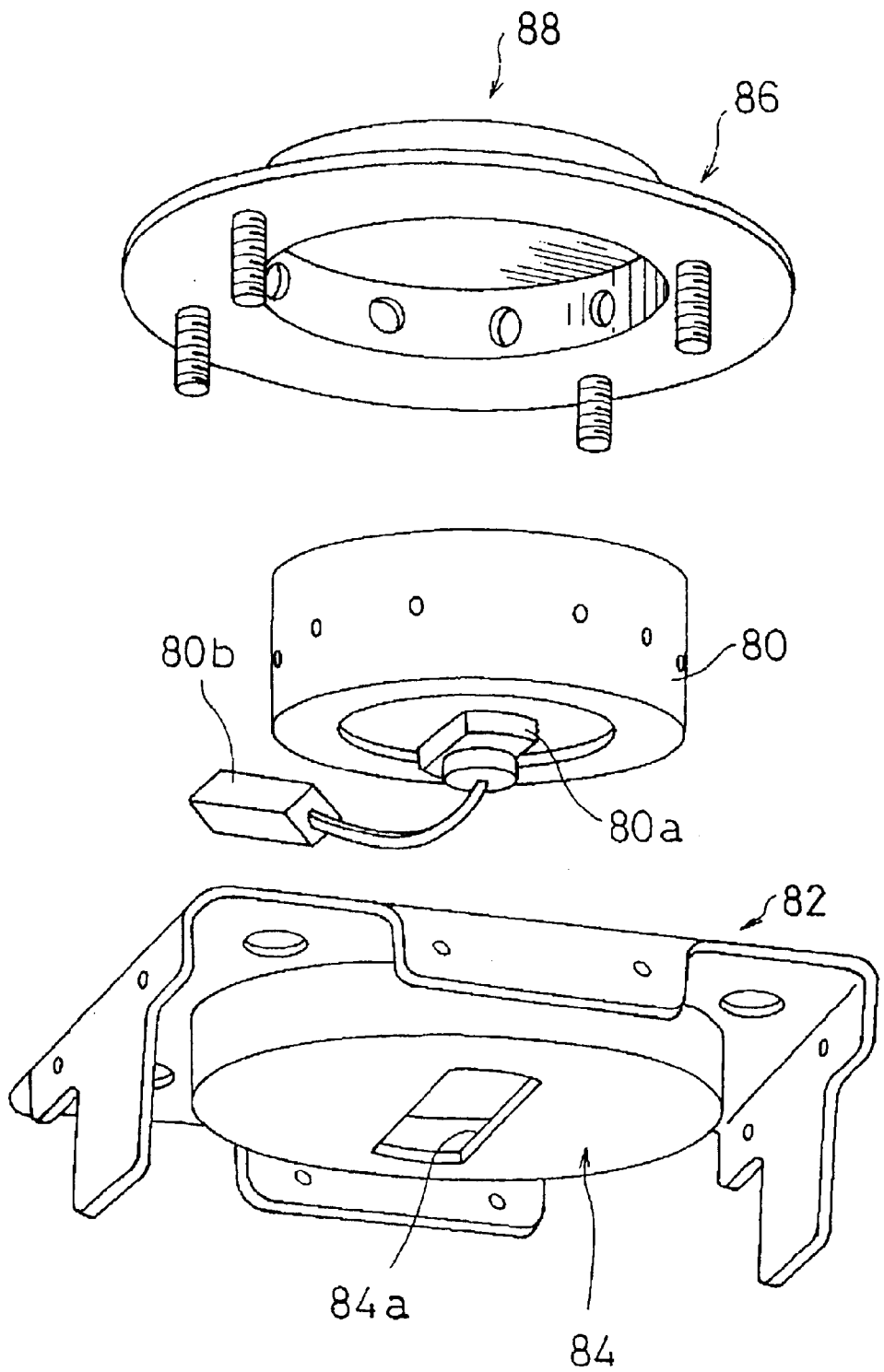
FIG. 9 is an assembly view showing the structure of a principal part of the airbag apparatus according to a sixth embodiment of the present invention viewed from the rear.

FIG. 4 is an assembly view of a principal part of the airbag apparatus according to another embodiment of the present invention; FIG. 5 is a sectional view of an essential part of the airbag apparatus; FIG. 6 is an enlarged sectional view of the part 6 in FIG. 5; FIG. 7 is an assembly view showing a modified example of the airbag apparatus; FIG. 8 is an assembly view of a principal part of an airbag apparatus according to still another embodiment of the present invention; and FIG. 9 is an assembly view showing a modified example of the positioning means for the inflator viewed from the rear of the airbag apparatus.

As shown in FIGS. 4 to 6, like the airbag apparatus 1 described above, an airbag apparatus 40 comprises a retainer 52, an inflator 54, an airbag 56, and an airbag-fitting member 58. The retainer 52 has an accommodating area 60 for accommodating the rear half of the inflator 54, and the airbag-fitting member 58 is provided with a capping portion 72 for holding the inflator 54 at the front face of the inflator 54.

The inflator 54 has a smooth side face, and does not have a fitting piece to the retainer 52 or the like. The front half of the inflator 54 is a gas ejection section in which plural gas ejection holes 54a are arranged on the side thereof. From the vicinity of the center of the rear surface of the inflator 54, a connector for connecting the inflator 54 to an inflator control device is pulled out.

In the vicinity of the front face center of the inflator 54, formed is an elevated or projection portion 54c engaging an opening 72c for inflator-positioning formed on the front face of the capping portion 72 of an airbag-fitting member 58 which will be described later. The opening 72c for inflator-positioning has a substantially elongated shape, and the elevated portion 54c has a substantially elliptical plane shape which is tightly fitted into the opening 72c. The rear half of the inflator 54 is accommodated within the accommodating area 60 of the retainer 52. When the capping portion 72 of the airbag-fitting member 58 is arranged on the front half of the inflator 54 so as to hold the front face of the inflator 54, the front face of the capping portion 72 is overlaid on the front face of the inflator 54, so that the opening 72c and the elevated portion 54c are non-swingablly brought into engagement with each other. Consequently, the inflator 54 can not be rotated or shifted from a predetermined position by a vehicle vibration, a gas injection pressure, or the like.

The airbag 56 is provided with an opening 64 for the inflator at the rear end of the airbag 56, and in the periphery of the opening 64, there are plural slit insertion holes 66 formed for receiving claws 58a of the airbag-fitting member 58 which will be described later. The periphery of the opening 64 is overlaid on the fringe of an opening 60a of the accommodating area 60 in the retainer 52.

The retainer 52 comprises the accommodating area 60 for the inflator in the vicinity of the center. The structure of the accommodating area 60 is identical to that of the inflator-reception area 14 formed in the retainer 2 of the airbag apparatus 1 described before, which comprises the opening 60a for inflator-insertion, a substantially cylindrical peripheral wall 60b extending from the periphery of the opening 60a toward the rear of the retainer 52, and an inward flange 60c disposed in the rear end of the peripheral wall 60b.

For the accommodating area 60, the lower half of the inflator 54 is inserted from the opening 60a, and is detachably supported by the peripheral wall 60b extending along the side of the inflator 64 and the inward flange 60c located at the rear face of the inflator 54. At this time, a connector 54b for connecting between the inflator 54 and an inflator control device is pulled out through an opening 60d surrounded by the inward flange 60c at the rear end of the accommodating area 60.

In the fringe of the opening 60a in the retainer 62, formed are insertion holes 68 for insertion of the claws 58a of the airbag-fitting member 58 like the insertion holes 66 of the airbag 56 described above. In addition, in the embodiment, the retainer 52 is also made from a steel plate, etc., to have a plate shape, and the accommodating area 60 is formed integrally with the retainer 52 by press forming or the like.

The airbag-fitting member 58 comprises an opening 70 for inflator-insertion and has a ring-shaped external appearance overlapping the fringe of the opening 64 from the inner side of the airbag 56. The airbag-fitting member 58 holds the fringe of the opening 64 from the inside of the airbag 56, and the fringe of the opening 64 is clamped between the airbag-fitting member 58 and the periphery of the opening 60a in the retainer 52, so that the airbag 56 is fixed to the retainer 52.

As mentioned above, the airbag-fitting member 58 is provided with the claws 58a which are cut and raised from the periphery of the opening 70 and extending toward the rear. When the airbag 56 is attached to the retainer 52, the airbag-fitting member 58 is overlapped on the fringe of the opening 64 in the airbag 56 so as to hold the fringe while the claws 58a are inserted into the respective insertion holes 66 and 68 of the airbag 56 and the retainer 52. After the claws 58a are inserted into the insertion holes 66 and 68, as shown in FIG. 6, the tip end portions thereof protruding toward the rear face of the retainer 52 are bent along the rear face of the retainer 52, and the airbag-fitting member 58 is thereby fixed to the retainer 52.

The airbag-fitting member 58 is provided with the capping portion 72 for holding the front surface of the inflator 54 accommodated in the accommodating area 60 of the retainer 52 just like the airbag-fitting member 8 in the airbag apparatus 1. This capping portion 72 comprises a peripheral wall 72a extending forwardly from the fringe of the opening 70 for inflator-insertion and an inward flange 72b formed so as to hold the front face of the inflator 54 by being disposed over the front face of the inflator 54 from the tip end of the peripheral wall 72a.

When the airbag-fitting member 58 is attached to the retainer 52, a gas ejection part in the front half of the inflator 54 is inserted into the opening 70 of the airbag-fitting member 58, to and the inflator 54 accommodated in the accommodating area 60 of the retainer 52 can not slip out of the accommodating area 60 by the peripheral wall 72a extending along the side face of the inflator 54 and the inward flange 72b for holding the front face of the inflator 54.

In addition, the peripheral wall 72a is provided with substantially elongated hole-like gas introduction holes 74 formed at positions overlapping the gas ejection holes 54a arranged on the side face of the gas ejection part in the inflator 54 so as to expose the gas ejection holes 54a. Gas ejected from the gas ejection holes 54a is introduced into the airbag 56 via the gas introduction holes 74. On the front face of the capping portion 72 in the airbag-fitting member 58, the opening 72c surrounded by the inward flange 72b is formed. The opening 72c having a substantially elongated hole-like shape is engaged with the above-mentioned elevated portion 54c of the inflator 54 so that the inflator 54 is fixed at a predetermined position.

When constructing the airbag apparatus 50, first, the airbag 56 is arranged on the front face of the retainer 52 so that the fringe of the opening 64 at the rear end of the airbag 56 overlaps the fringe of the opening 60a in the retainer 52. At this time, the rear half of the inflator 54 is accommodated in the accommodating area 60 of the retainer 52. The gas ejection part in the front half of the inflator 54 is introduced in the airbag 56 from the opening 64 of the airbag 56, and the connector 54b pulled from the rear face of the inflator 54 is pulled out through the opening 60d at the rear end of the accommodating area 60.

Next, the airbag-fitting member 58 is overlapped with the fringe of the opening 64 in the airbag 56 from the inside of the airbag 56 so as to hold the fringe thereof. At this time, the gas ejection part of the inflator 54 is inserted into the opening 70 of the airbag-fitting member 58, so that the front face of the inflator 54 is held by the capping portion 72 of the airbag-fitting member 58 while the elevated portion 54c on the front face of the inflator 54 is engaged with the opening 72c in the capping portion 72. Also, the claws 58a of the airbag-fitting member 58 are inserted into the respective insertion holes 66 and 68 of the airbag 56 and the retainer 52, and the tip end portions of the claws 58a protruding from the rear face of the retainer 52 are bent along the rear face of the retainer 52, so that the airbag 56 and the airbag-fitting member 58 are fixed to the retainer 52.

Then, the airbag 56 is folded, and the airbag apparatus 50 is completed by arranging a module cover (not shown) so as to cover the front face of the folded airbag 56.

Also, in the airbag apparatus 50 formed as above, the airbag-fitting member 58 can be securely fixed to the retainer 52. On the front face of the inflator 54, the elevated portion 54c of the inflator 54 and the opening 72c of the capping portion 72 are brought into engagement with each other, so that the inflator 54 can not be rotated or shifted due to a vehicle vibration, a gas ejection pressure, or the like. Thus, the inflator 54 can be securely fixed to a predetermined position.

In the embodiment, the means for fixing the airbag-fitting member 58 to the retainer 52 is formed such that the airbag-fitting member 58 is provided with the claws 58a which are cut and raised from the periphery of the opening 70. After the claws 58a are inserted into the respective insertion holes 66 and 68 of the airbag 56 and the retainer 52, the tip end portions of the claws 58a protruding from the rear face of the retainer 52 are bent along the rear face of the retainer 52. The means for fixing the airbag-fitting member 58 to the retainer 52 is not limited to this.

For example, it may have a shape, as shown in FIG. 7, such that protruding pieces 58c extending from the outer fringe of the airbag-fitting member 58 are bent rearward from the base ends. The fixing means may also be so formed, as shown in FIG. 8, that the insertion holes 66 and 68 have circular shapes for insertion of bolts, rivets, or the like, and in the periphery of the opening 70 in the airbag-fitting member 58, insertion holes 58b for insertion of bolts, rivets, or the like are formed like the insertion holes 66 and 68 of the airbag 56 and the retainer 52. After the respective fringes of the openings for the inflator in the airbag 56, the retainer 52 and the airbag-fitting member 58 are overlaid on each other, the airbag 56, the retainer 52 and the airbag-fitting member 58 are integrally connected to each other with bolts, rivets, or the like via a series of the insertion holes 58b, 66 and 68.

The means for inflator-positioning is not also limited to the structure in the embodiment.

For example, in FIG. 7, on the front face of the inflator 54, a pair of small projections 54d is formed, and on the front face of the capping portion 72, engaging holes 72d for fixing the inflator 54 at a predetermined position by engaging the small projections 54d are formed. In FIG. 8, on the front face of the to inflator 54, a rib 54e having a substantially semi-cylindrical shape is formed, and on the front face of the capping portion 72, a protuberance 72e having a substantially inverted U-shaped in cross section to be forwardly enlarged from the front face of the capping portion 72 is formed. By the engagement between the rib 54e and the protuberance 72e, the inflator 54 is fixed to a predetermined position.

Moreover, the means for inflator-positioning may be formed on the rear face of an inflator. For example, the rear half of an inflator 80 shown in FIG. 9 is accommodated in an inflator-accommodating area 84 of a retainer 82. In the vicinity of the center of the rear face of the accommodating area 84, an opening 84a having a substantially elongated-hole shape is formed. On the rear face of the inflator 80, formed is an elevated or projecting portion 80a having a substantially elongated-circular planar shape and being capable of engaging tightly with the opening 84a. A connector 80b is pulled out of the vicinity of the center of the top face of the elevated portion 80a.

When the inflator 80 is placed on the retainer 82, first, the rear half of the inflator 80 is accommodated into the accommodating area 84 of the retainer 82. At this time, the connector 80b of the inflator 80 is inserted into the opening 84a at the rear of the accommodating area 84, and the elevated portion 80a is brought into engagement with the opening 84a. Next, an airbag-fitting member 86 having a capping portion 88 for holding the front face of the inflator 80 at the front face of the inflator 80 is placed on the front face of the retainer 82 and the inflator 80. Therefore, while the inflator 80 is held by the accommodating area 84 and the capping portion 88, the inflator 80 is securely fixed to the retainer 82 because the elevated portion 80a is non-rotatably and non-swingablly brought into engagement with the opening 84a.

Figure 10:
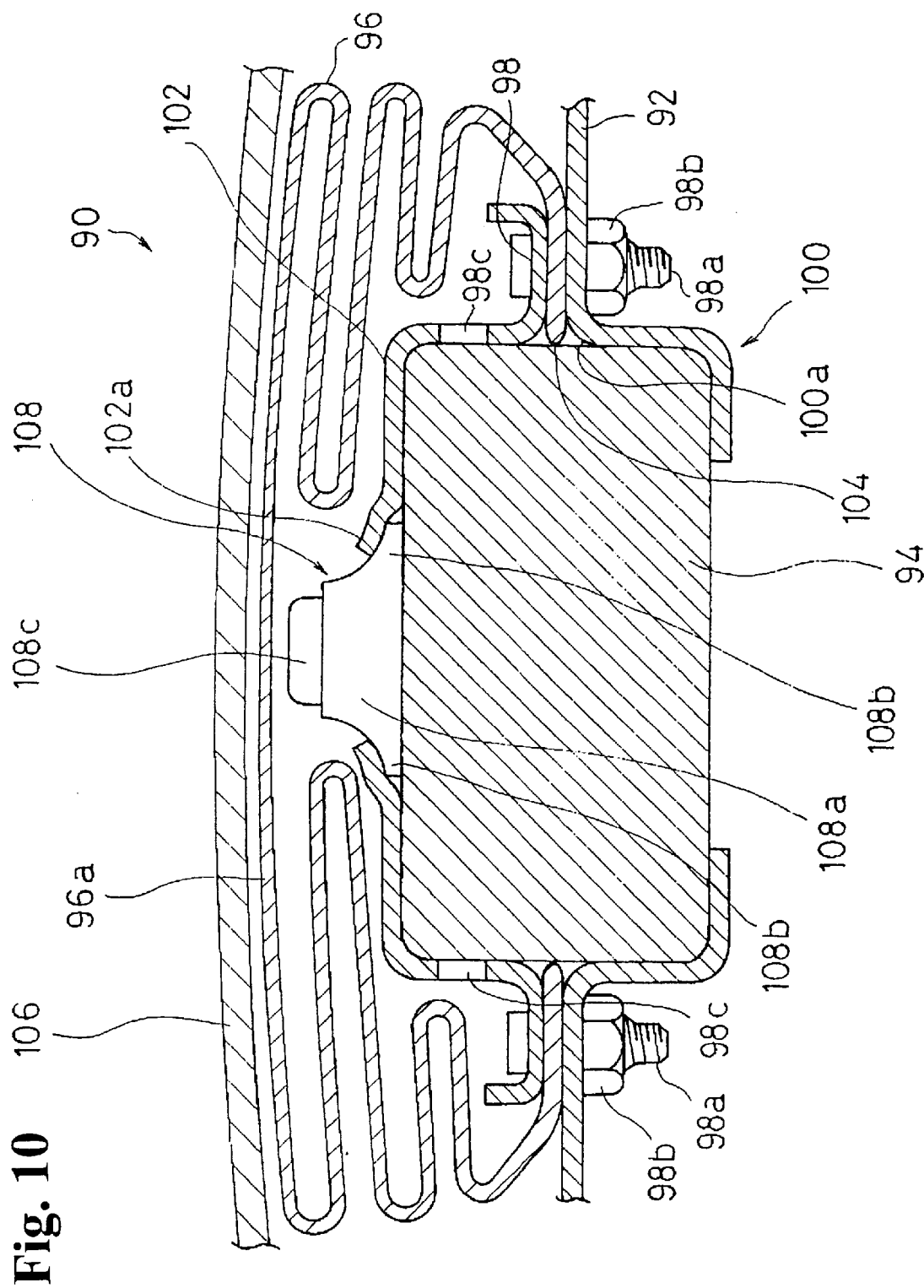
FIG. 10 is a sectional view showing the structure of a principal part of the airbag apparatus according to a seventh embodiment of the present invention.

In the airbag apparatus according to the present invention, between the front face of the inflator and the module cover, a switch, such as a horn switch, may be arranged. At this time, the switch may be arranged so as to be supported by the inflator and the capping portion of the airbag-fitting member at the front face of the inflator. An airbag apparatus constructed in such a manner will be described below with reference to FIG. 10. FIG. 10 is a sectional view of the structure of the airbag apparatus according to this embodiment.

In the embodiment, an airbag apparatus 90 comprises a retainer 92, an inflator 94, an airbag 96, and an airbag-fitting member 98. The retainer 92 is provided with an accommodating area 100 for accommodating the rear half of the inflator 94, and the airbag-fitting member 98 includes a capping portion 102 for holding the front face of the inflator 94 at the front face of the inflator 94. The inflator 94 has a smooth side face without a fitting piece to the retainer 92, and the rear half of the inflator 94 is accommodated in the accommodating area 100 while the front face of the inflator 94 is held by the capping portion 102, so that the inflator 94 is fixed to the retainer 92.

The airbag 96 includes an opening 104 at the rear end thereof for the inflator. The front half of the inflator 94 is inserted within the airbag 96 from the opening 104. The periphery of the opening 104 is overlaid on the fringe of an opening 100a of the accommodating area 100 on the front face of the retainer 92. The airbag-fitting member 98 is arranged along the inner peripheral surface of the airbag 96 so as to hold the fringe of the opening 104. The periphery of the opening 104 is clamped between the periphery of the opening 100a in the retainer 92 and the airbag-fitting member 98, so that the airbag 96 is fixed to the retainer 92. In addition, the airbag-fitting member 98 has male-screws 98a extending rearward which are inserted into insertion holes (not shown) formed in the airbag 96 and the retainer 92, so that the airbag-fitting member 98 is fixed to the retainer 92 by fastening nuts 98b from the tip ends of the male-screws 98a protruding from the rear face of the retainer 92.

On the front face of the inflator 94, a horn switch 108 is arranged. The horn switch 108 comprises a switch body 108a placed on the front face of the inflator 94, a flange 108b extending from the bottom of the switch body 108a along the front face of the inflator 94, and a pin 108c with the tip end thereof protruding from the front face of the switch body 108a. The pin 108c is inserted into a pin-insertion area (not shown) movably in the front and rear directions and non-extractablly from the pin-insertion area, and is normally urged forwardly by urging means such as a spring (not shown). The horn switch 108 is turned on by pressing the tip end of the pin 108c into the switch body 108a so that an automobile horn (alarm whistle, not shown) is started to blow. When the pressing of the pin 108c is ceased, the blowing of the horn is of course stopped by returning to the original state of the pin 108c (protruded state of the tip end of the pin 108c from the switch body 108a) due to the above-mentioned urging means.

The horn switch 108 is supported on the front face of the inflator 94 by a switch-supporting portion 102a which extends from the capping portion 102 of the accommodating area 98 so as to hold the top face of the flange 108b.

A front face 96a of the airbag 96 covers the front faces of the horn switch 108 and the inflator 94, etc., and both sides of the airbag 96 are folded in bellows so that the airbag 96 is arranged on both sides of the inflator 94. Furthermore, a module cover 106 is arranged so as to cover the airbag 96.

The module cover 106 is made from a synthetic resin, etc., and is elastically deformable by a driver pressing the front face thereof. The module cover 106 and the horn switch 108 are arranged such that the rear face of the module cover 106 and the tip end of the pin 108c of the horn switch 108 are positioned so as to approach each other. By pressing the front face of the module cover 106, the rear face of the module cover 106 abuts against the tip end of the pin 108c via the front face of the airbag 96, so that the tip end of the pin 108c is pushed into the switch body 108a so as to turn the switch on for blowing the horn.

Like the airbag apparatuses in the other embodiments, the airbag apparatus 90 is arranged in an automobile steering wheel (not shown). In an emergency, such as a vehicle collision, the inflator 96 is operated so as to eject gas which is introduced into the airbag 96 via gas-introduction holes 98c formed on the side of the airbag-fitting member 98 so as to initiate the inflation of the airbag 96. Since the horn switch 108 is securely fixed to the front face of the inflator 94 by the switch-supporting portion 102a, at this time, the horn switch 108 can not be removed from the inflator 94 due to a gas pressure, etc. Furthermore, since the inflation of the airbag 96 and the opening of the module cover 106 by the pushing of the airbag 96 are not prevented, the airbag 96 can spread out in a vehicle cabin without any interruption even in the airbag apparatus 90 formed in such a manner.

In the airbag apparatus 90 formed in such a manner, since the switch, such as the horn switch 108, is supported on the front face of the inflator 94 by the supporting portion 102a disposed in the capping portion 102, the switch body is securely fixed to the inflator 94 as described above, even when urging the front face of the module cover 106 so as to operate the switch, thereby obtaining excellent operability.

Figure 11:
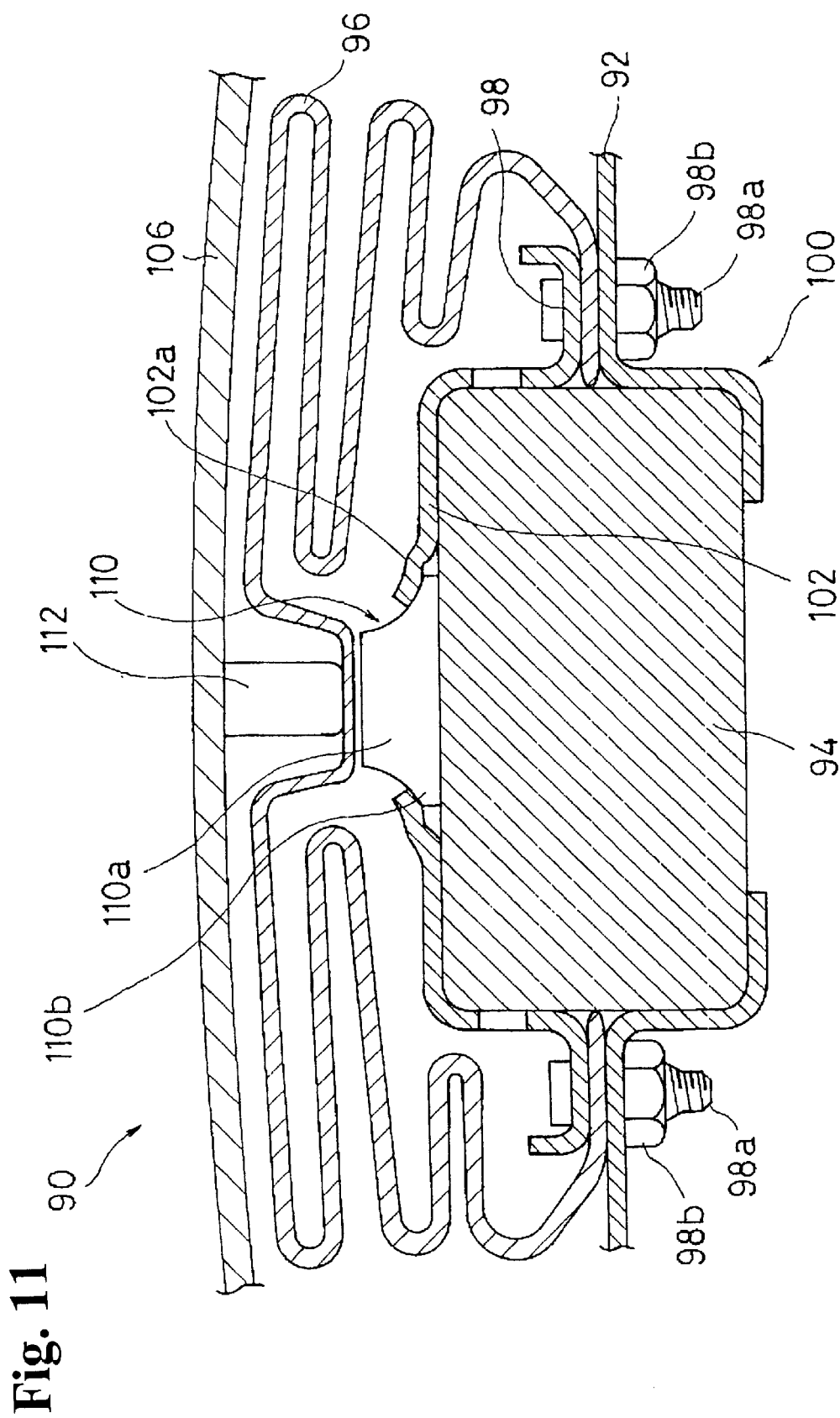
FIG. 11 is a sectional view of the principal part showing a modified example of the airbag apparatus shown in FIG. 10.

In addition, in the embodiment, the horn switch comprises the pin with the protruding tip end thereof to be pushed by a driver urging the front face of the module cover so as to turn the horn switch on. The switch and the module cover, however, are not limited to the particular structure, and the airbag apparatus 90 may comprise a horn switch 110 in which, as shown in FIG. 11, the tip end of a pin (not shown) is flush with the upper face of a switch body 110a, for example.

The horn switch 110 comprises a switch body 110a placed on the front face of the inflator 94, a flange 110b extending along the front face of the inflator 94 from the bottom of the switch body 110a and having a front face held by the supporting portion 102a of the airbag-fitting member 98, and a pin (not shown) which is inserted into a pin-insertion area (not shown) formed from the front face of the switch body 110a slidably in the front and rear directions and non-extractablly from the pin-insertion area. The to pin is normally urged forward by urging means such as a spring (not shown), and the tip end face of the pin is substantially flush with the top surface of the switch body 110a. By pushing the pin into the switch body 110a, the automobile horn is started to blow.

In such a horn switch 110, the module cover 106 of the airbag apparatus 90 is provided with a projection 112 on the rear face of the module cover 106 at a position opposing the tip end face of the pin. The tip end of the projection 112 approaches the tip face of the pin, and when an occupant pushes the front face of the module cover, the projection 112 abuts against the tip face of the pin via the front face of the airbag 96 to move the pin into the switch body 110a so as to turn the horn switch on.

Even in such a structure, since the horn switch 110 is supported on the front face of the inflator 94 by the supporting portion 102a disposed in the capping portion 102, the switch body is securely fixed to the inflator 94 as described above, even when urging the front face of the module cover 106 so as to operate the switch, thereby obtaining excellent switch-operability.

Figure 12:
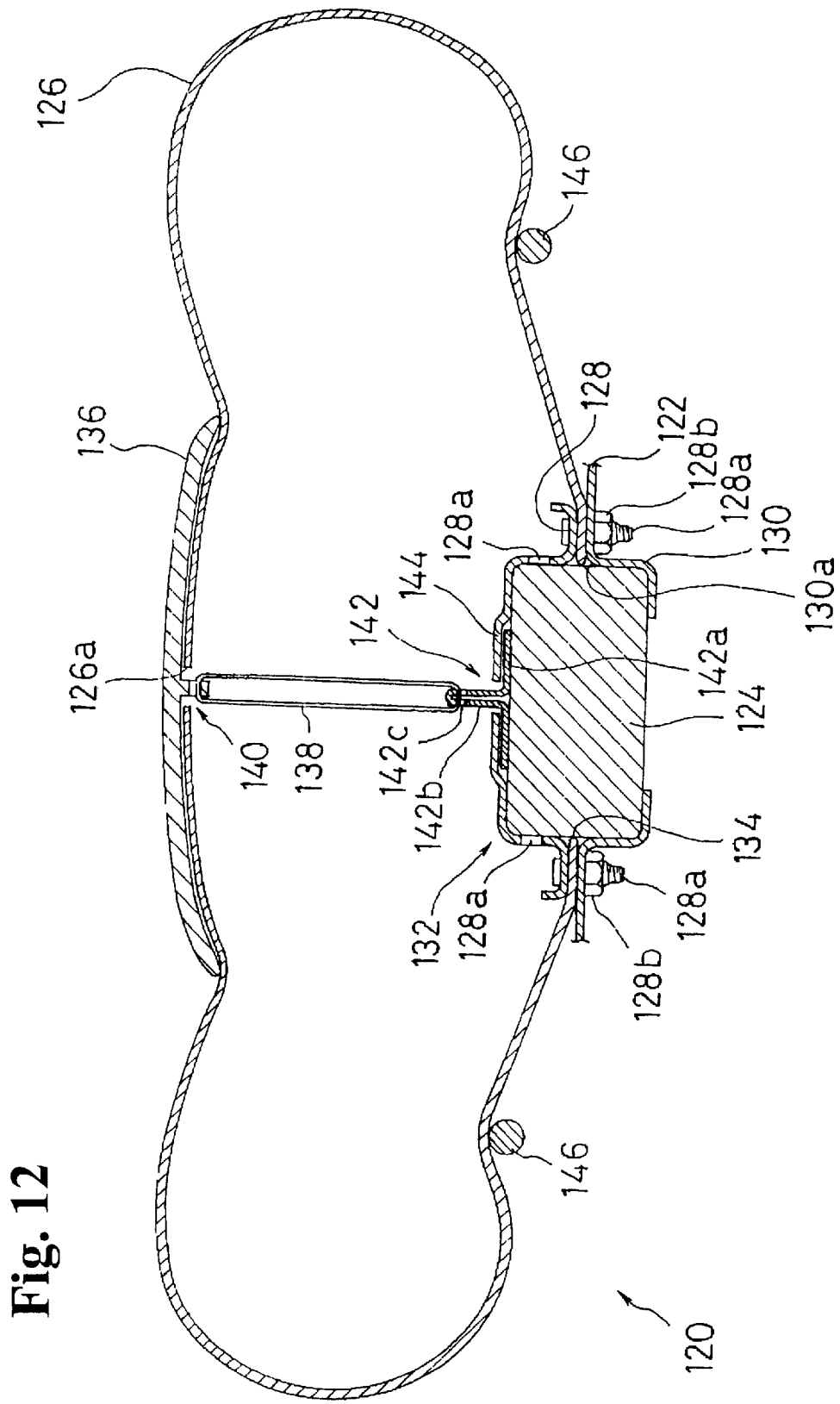
FIG. 12 is a sectional view of the airbag apparatus according to an eighth embodiment of the present invention when the airbag is inflated.
Figure 13:
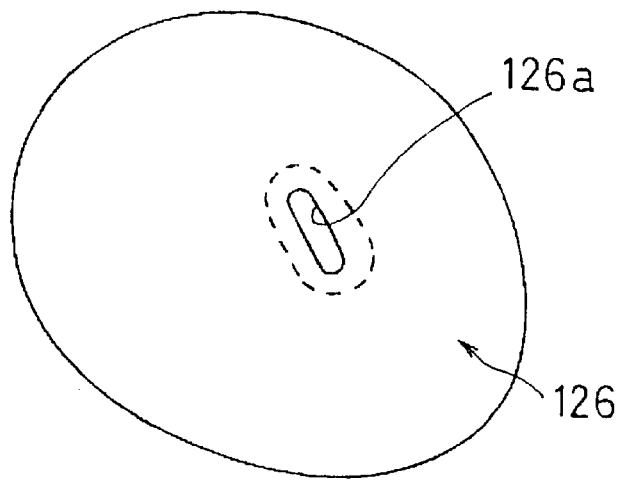
FIG. 13 is a perspective view of the airbag of the airbag apparatus shown in FIG. 12.
Figure 14:
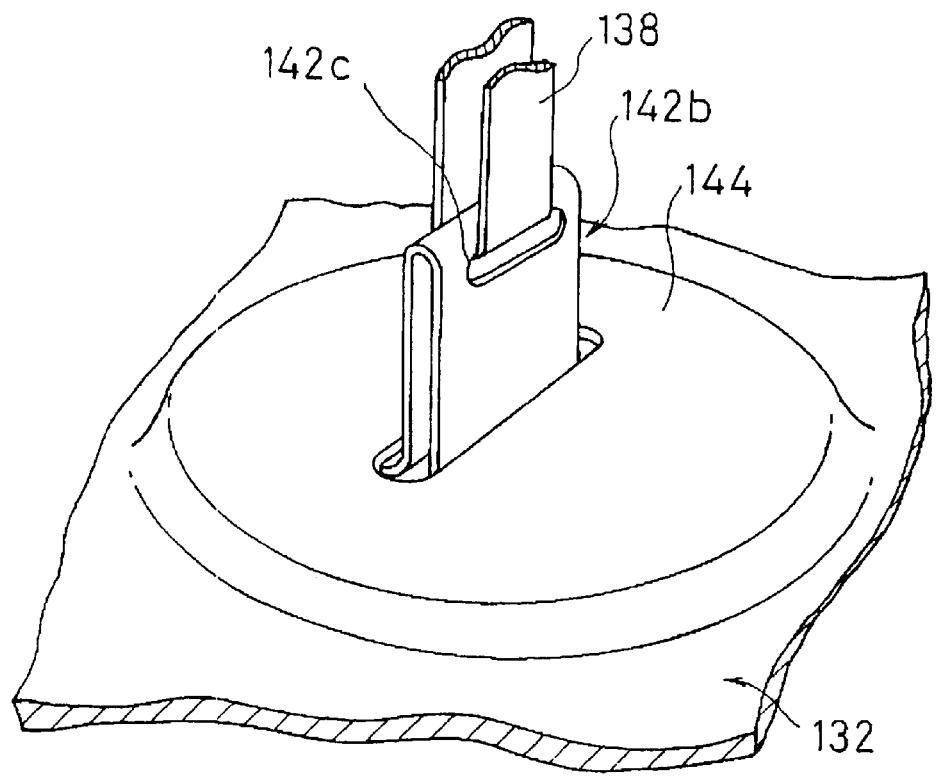
FIG. 14 is an enlarged perspective view of an essential part of the airbag apparatus shown in FIG. 12.
Figure 15:
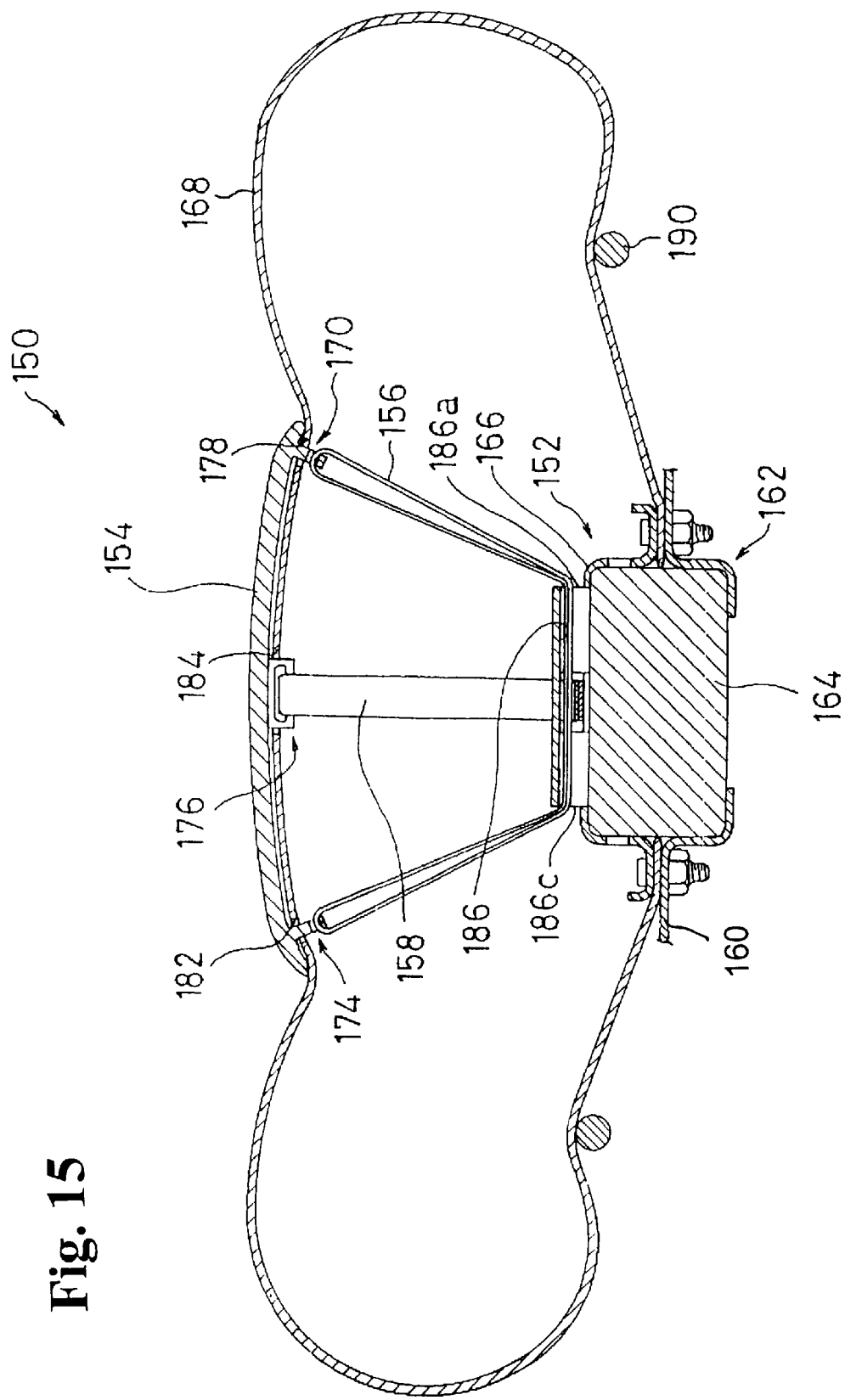
FIG. 15 is a sectional view of the airbag apparatus according to a ninth embodiment of the present invention when the airbag is inflated.
Figure 16:
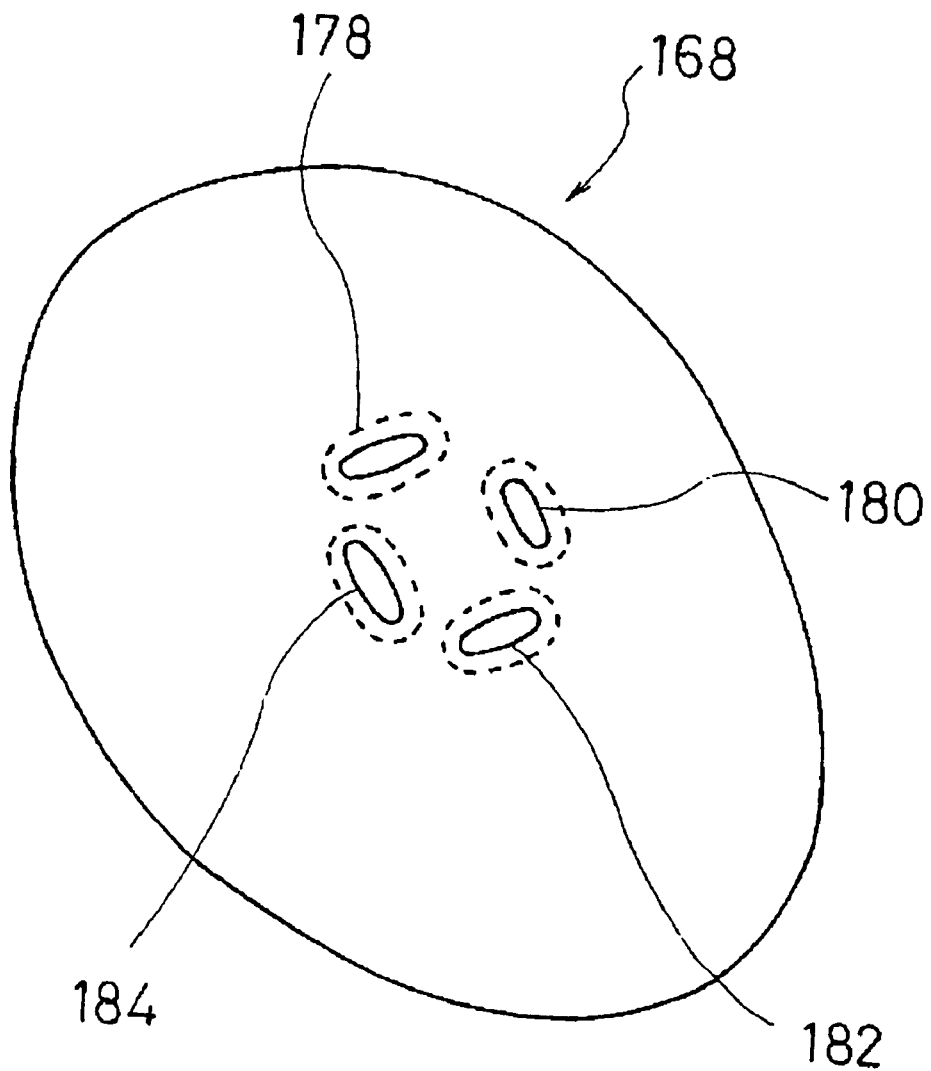
FIG. 16 is a perspective view of the airbag of the airbag apparatus shown in FIG. 15.
Figure 17:
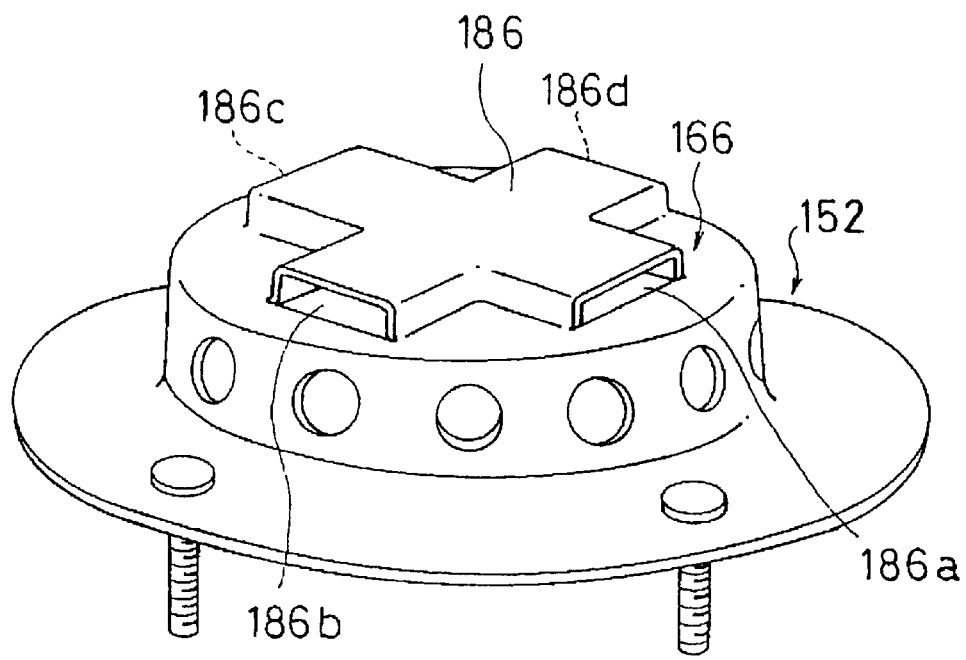
FIG. 17 is a perspective view of an airbag-fitting member of the airbag apparatus shown in FIG. 15
Figure 18:
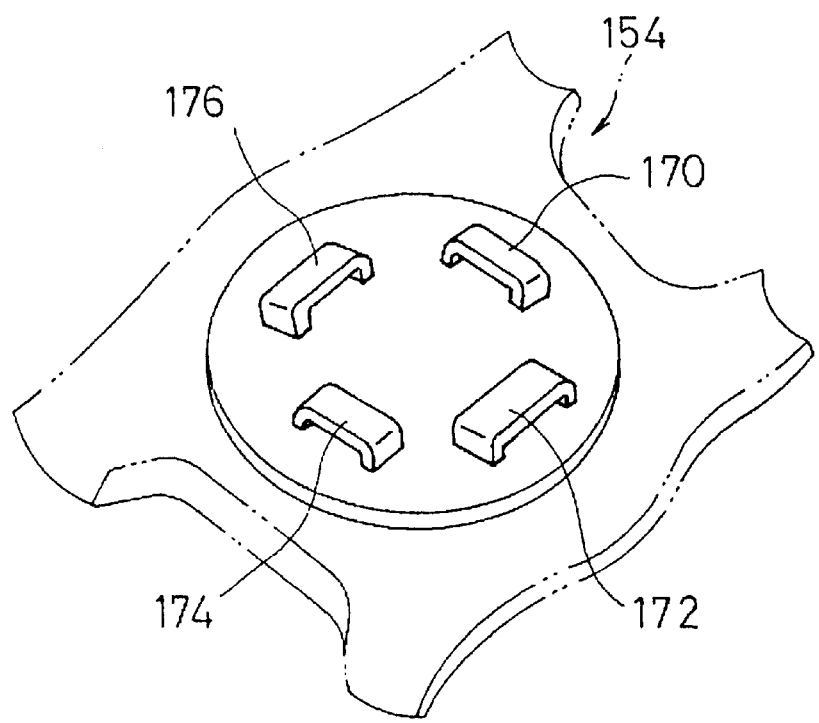
FIG. 18 is a perspective view of a module cover of the airbag apparatus shown in FIG. 15 viewed from the rear.

Then, the airbag apparatus according to another embodiment of the present invention will be described with reference to FIGS. 12 to 18, and 23. FIG. 12 is a sectional view of the airbag apparatus according to another embodiment of the present invention when the airbag is inflated; FIG. 13 is a perspective view of the front face of the airbag in the airbag apparatus; FIG. 14 is a perspective view of a connecting section between a capping portion of an airbag-fitting member and a strap; FIG. 15 is a sectional view of a modified example of the airbag apparatus; FIG. 16 is a perspective view of the front face of the airbag in the airbag apparatus shown in FIG. 15; FIG. 17 is a perspective view of the airbag-fitting member in the airbag apparatus shown in FIG. 15; and FIG. 18 is a perspective view of a module cover viewed from the rear in the airbag apparatus shown in FIG. 15.

In the embodiment, an airbag apparatus 120 comprises a retainer 122, an inflator 124, an airbag 126, and an airbag-fitting member 128. The retainer 122 has an accommodating area 130 for accommodating the rear half of the inflator 124, and the airbag-fitting member 128 is provided with a capping portion 132 for holding the front face of the inflator 124 at the front face of the inflator 124. The inflator 124 has a smooth side face without having a fitting piece to the retainer 122. The rear half of the inflator 124 is accommodated in the accommodating area 130, and the front face of the inflator 124 is held by the capping portion 132 so that the inflator 124 is fixed to the retainer 122.

The airbag 126 is provided with an opening 134 for the inflator at the rear end of the airbag 126, and from the opening 134, the front half of the inflator 124 is inserted into the airbag 126. The periphery of the opening 134 is overlaid on the fringe of an opening 130a of the accommodating area 130 on the front face of the retainer 122. The airbag-fitting member 128 is arranged along the inner peripheral surface of the airbag 126 so as to hold the fringe of the opening 134 in the airbag 126. The periphery of the opening 134 is clamped between the fringe of the opening 130a in the retainer 122 and the fitting member 128, so that the airbag 126 is fixed to the retainer 122. In addition, the fitting member 128 has male-bolts 128a extending rearward. The male-bolts 128a are inserted into insertion holes (not shown) formed in the airbag 126 and the retainer 122, and the fitting member 128 is fixed to the retainer 122 by fastening nuts 128b from the tip ends of the male-bolts 128a protruding from the rear face of the retainer 122.

A module cover 136 is attached on the front face of the airbag 126. On the back face of the module cover 136, an insertion-through area 140 for inserting one end of a strap 138 for connecting the module cover 136 to the airbag-fitting member 128 is formed. In the vicinity of the airbag center on the front face, an opening 126a for introducing the strap 138 inside the airbag 126 is formed.

On the front face of the inflator 124, a connecting member 142 for connecting the airbag-fitting member 128 to the module cover 136 via the strap 138 is arranged. The connecting member 142 comprises a planar base 142a disposed along the front face of the inflator 124 and a convex portion 142b protruding forward from the vicinity of the center of the base 142a having an insertion area 142c disposed therein to be inserted by the other end of the strap 138. The front face of the connecting member 142 is held by a connecting member-capping portion 144 disposed so as to extend around the front face of the base 142a. Therefore, the connecting member 142 is fixed to the airbag-fitting member 128 on the front face of the inflator 124.

The strap 138 is made from a cloth strip, such as webbing, for an automobile seat belt having such a strength that bursting and elongation do not occur when the airbag is inflated. One end of the strap 138 is inserted into the insertion-through area 140 and is subsequently introduced within the airbag 126 via the opening 126a of the airbag 126, while the other end is inserted into the insertion area 142c inside the airbag 126 and thereafter, the strap 138 becomes a loop in which both ends are connected to each other. The airbag-fitting member 128 and the module cover 136 are connected together via the strap 138. Therefore, when the airbag 126 is inflated, the module cover 136 can not be separated from the airbag-fitting member 128 at an interval more than a predetermined distance.

The airbag apparatus 120 is placed in a steering wheel 146 after the airbag 126 is folded and the module cover 136 is arranged on the front face of the airbag 126 so as to cover the folded airbag 126.

In the airbag apparatus 120 constructed in such a manner, in an emergency, such as a vehicle collision, the inflator 124 is operated so as to eject gas which is introduced into the airbag 126 via gas-introduction holes 128a formed on the side of the airbag-fitting member 128 so as to initiate the inflation of the airbag 126. At this time, the airbag 126 is inflated so that the front face thereof pushes the module cover 136 forwardly. After the module cover 136 proceeds forwardly at a predetermined distance following the inflation of the front face of the airbag 126, the strap 138 is tightly stretched so as to stop the proceeding or movement. Consequently, since the front face of the airbag 126 disposed on the rear face of the module cover 136 is prevented from inflating toward the front by the module cover 136, both sides of the airbag 126, which are not prevented from inflating, are largely inflated sideways due to a gas pressure, so that the airbag 126 is spread over a wide range outside the steering.

In the airbag apparatus 120, since the airbag 126 is restrained from inflating toward the front by the strap 138 in the early stage of the inflation, a gas pressure from the inflator 124 is solely used for spreading sideways of the airbag 126. Therefore, the airbag 126 is spread over a wide range outside the steering wheel 146, so that the airbag 126 lies between a driver and the steering wheel 146 extremely sufficiently, enabling the driver to be securely protected.

In addition, the module cover and the airbag-fitting member are connected together with one strap in the embodiment. However, the number of straps and the connecting method among the strap, the module cover and the airbag-fitting member are not limited to the particular structure previously mentioned. For example, as shown in FIG. 15, in an airbag apparatus 150, an airbag-fitting member 152 and a module cover 154 are connected together with two loop straps 156 and 158.

Like the airbag apparatuses described above, an airbag apparatus 150 comprises a retainer 160, an inflator 164 accommodated in an accommodating area 162 of the retainer 160, the airbag-fitting member 152 having a capping portion 166 for holding the front face of the inflator 164 around the front face of the inflator 164, and an airbag 168 fixed to the retainer 160 by the airbag-fitting member 152. On the front face of the airbag 168, the module cover 154 is attached. The capping portion 166 extends so as to cover the front face of the inflator 164.

On the rear face of the module cover 154, arranged are four insertion areas 170, 172, 174 and 176 to be inserted by the straps 156 and 158 for connecting between the module cover 154 and the airbag-fitting member 152. As shown in FIG. 18, these insertion areas 170, 172, 174 and 176 are arranged so that the insertion areas 170 and 174 oppose each other and the insertion areas 172 and 176 oppose each other. At the positions of the airbag 168 overlapping with the respective insertion areas 170 to 176, openings 178, 180, 182 and 184 for introducing the respective straps 156 and 158 are provided.

As shown in FIG. 17, on the front face of the capping portion 166 in the airbag-fitting member 152, a strap introduction area 186 formed of a substantially cross-shaped expanded body is provided. At four ends of the strap introduction area 186 extending in a substantially cross shape, openings 186a, 186b, 186c and 186d communicating with each other are formed.

The straps 156 and 158 are made from webbing for an automobile seat belt, etc., like in the embodiment described above. After one end of the strap 156 is inserted into the insertion area 170, the one end thereof is inserted into the opening 178 of the airbag 168 inside the airbag 168 so as to be introduced into the strap introduction area 186 from the opening 186a. On the other hand, the other end of the strap 156 is pulled out of the opening 186c opposing the opening

186a after passing through the strap introduction area 186, and then after being outwardly pulled out of the opening 182 disposed at a position opposing the opening 178 of the airbag 168, the other end is inserted into the insertion area 174 opposing the insertion area 170 of the module cover 154. Thereafter, both ends of the strap 156 are connected together so that the strap 156 becomes a loop for connecting between the module cover 154 and the airbag-fitting member 152. Like the strap 156, also in the strap 158, an intermediate portion thereof is inserted through the strap introduction area 186 via the openings 186b and 186d opposing each other inside the airbag 168 while both ends of the strap 158 are pulled out of the respective openings 180 and 184 of the airbag 168 so as to be inserted into the respective insertion areas 172 and 176 for connecting between the module cover 154 and the airbag-fitting member 152 as a loop.

The airbag apparatus 150 is placed in an automobile steering wheel 190 after the airbag 168 is folded and the module cover 154 is arranged so as to cover the folded airbag 168.

Also, in the airbag apparatus 150, like the above-described airbag apparatus 120, since the module cover 154 and the airbag-fitting member 152 are connected together with the straps 156 and 158, the airbag 168 is restrained from inflating toward the front in the early stage of the inflation. Since a gas pressure from the inflator 164 is solely used for spreading sideways of the airbag 168, the airbag 168 is spread over a wide range outside the steering wheel 190. The airbag 168 lies between a driver and the steering wheel 190 extremely sufficiently, enabling the driver to be securely protected.

In the airbag apparatus 150 as well, since the module cover 154 and the airbag-fitting member 152 are connected together with the two loop straps 156 and 158, during the airbag inflation, the forward proceeding or movement of the module cover can be securely stopped even when using an inflator having high power, for example.

In addition, the straps restrain the forward inflation of the airbag by connecting the module cover to the airbag-fitting member in the embodiment. However, it is not limited to the structure. An emblem instead of the module cover may be connected to the airbag-fitting member, for example, or the forward inflation of the airbag may be directly restrained by connecting the internal peripheral surface of the airbag and the airbag-fitting member together.

In addition, in the embodiment described above, the inflator is substantially cylindrical and has smooth sides, and the rear half of the inflator is accommodated in the accommodating area of the retainer. The gas injection part in the front half thereof is surrounded by the peripheral wall of the capping portion in the airbag-fitting member, and the front face of the inflator is held by the inward flange so that the inflator is fixed to the retainer. However, the inflator configuration and the structures of the accommodating area of the retainer and the capping portion of the airbag-fitting member are not limited to these structures.

Figure 23:
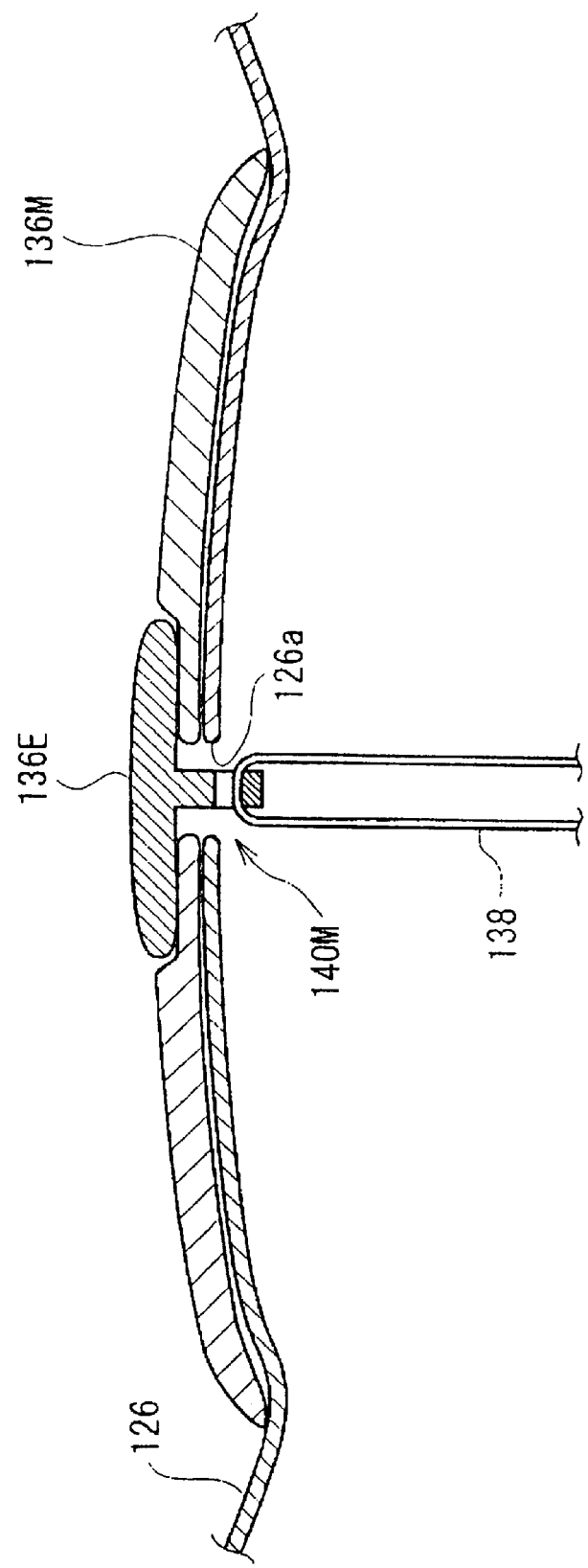
FIG. 23 is a schematic representation of a modified example of the airbag-fitting member in the airbag apparatus according to the present invention.

According to the present invention, when an emblem 136E is provided as in a module cover 136M shown in FIG. 23, an insertion area 140M may be formed in the emblem 136E, into which a strap 138 may be inserted.

Figure 19:
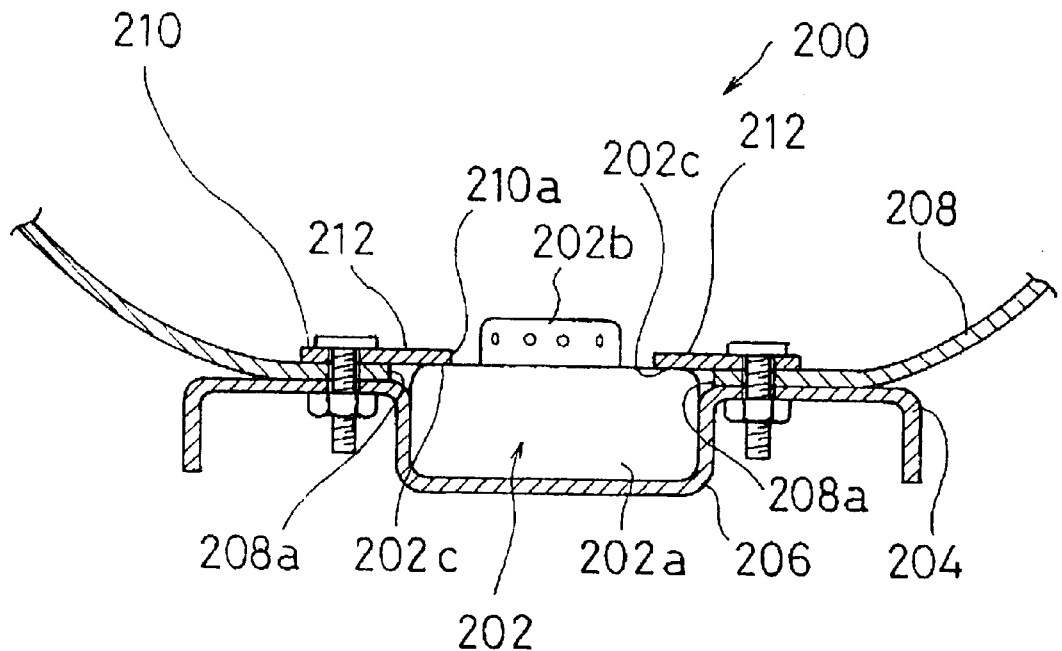
FIG. 19 is a sectional view showing the structure of a principal part of the airbag apparatus according to a tenth embodiment of the present invention.
Figure 20:
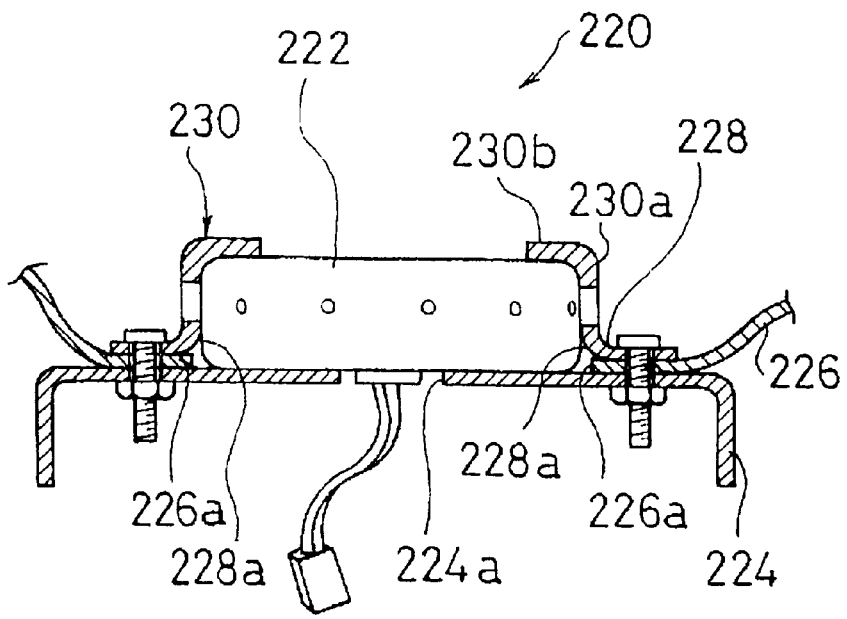
FIG. 20 is a sectional view showing the structure of a principal part of the airbag apparatus according to an eleventh embodiment of the present invention.

Other configurations of the accommodating area of the retainer and the capping portion of the airbag-fitting member will be described below with reference to FIGS. 19 and 20. FIG. 19 is a sectional view of an essential part of an airbag apparatus showing other structure of the accommodating area of the retainer and the capping portion of the airbag-fitting member, and FIG. 20 is a sectional view of an essential part of an airbag apparatus showing still other structure of the accommodating area of the retainer and the capping portion of the airbag-fitting member.

As shown in FIG. 19, an airbag apparatus 200 comprises an inflator 202 having a larger diameter part 202a in the rear half thereof including a gas generating part and a smaller diameter part 202b in the front half thereof including a gas ejection part. The top surface of the larger diameter part 202a of the inflator 202 is a shoulder part 202c linking to the rear end of the smaller diameter part 202b. The inflator 202 does not have a fitting piece to a retainer 204 which will be described later.

In the vicinity of the center of the retainer 204, an accommodating area 206 for accommodating the approximately entire larger diameter part 202a of the inflator 202 is formed. On the front face of the retainer 204, an airbag 208 is arranged. At the rear end of the airbag 208, an opening 208a for the inflator is formed. The periphery of the opening 208a in the airbag 208 is overlaid on the fringe of the accommodating area 206 in the retainer 204 on the front face of the retainer 204.

An airbag-fitting member 210 is arranged along the internal surface of the airbag 208 so as to hold the periphery of the opening 208a in the airbag 208. The airbag-fitting member 210 has a substantially circular disc-shape and includes an opening 210a at the center thereof for receiving the smaller diameter part 202b of the inflator 202. The periphery of the opening 210a extends toward the front face of the shoulder part 202c of the inflator 202 so as to become a capping portion 212 for holding the front face of the shoulder part 202c when the airbag-fitting member 210 is placed on the fringe of the opening 208a in the airbag 208.

In the airbag apparatus 200 as described above, even when using the inflator 202 having the larger diameter part 202a in the rear half thereof with a gas generating part and the smaller diameter part in the front half thereof having a gas ejection part, the retainer 204 is provided with the accommodating area 206 for accommodating the approximately entire larger diameter part 202a of the inflator 202. The airbag-fitting member 210 has a substantially circular disc shape which has the opening 210a to receive the smaller diameter part 202b of the inflator 202, in which the periphery of the opening 210a extends toward the front face of the shoulder part 202c of the inflator 202 so as to form the capping portion 212 for holding the front face of the shoulder part 202c, so that the inflator 202 can be securely fixed to the retainer 204.

An airbag apparatus 220 shown in FIG. 20 comprises an inflator 222 having a smooth side, and a retainer 224 formed to have a substantially planar disc shape. In the vicinity of the center of the retainer 224, an insertion hole 224a for inserting a connector pulled out of the rear end of the inflator 222 is formed. From the inflator 222, the connector is inserted into the insertion hole 224a, and the inflator 222 is positioned so that the rear face thereof overlaps the periphery of the insertion hole 224a on the front face of the retainer 224. The airbag apparatus 220 also comprises an airbag 226 and an airbag-fitting member 228 for attaching the airbag 226 to the retainer 224.

The rear end of the airbag 226 and the airbag-fitting member 228 are provided with openings 226a and 228a for the inflator, respectively. In the airbag 226, the inflator 222 is inserted into the opening 226a, and the periphery of the opening 226a is overlaid with the fringe of the inflator 222 on the front face of the retainer 224.

The airbag-fitting member 228 is provided with a capping portion 230 comprising a substantially cylindrical peripheral wall 230a extending from the fringe of the opening 228a toward the front and extending along a side of the inflator 222 and an inward flange 230b extending from the tip end of the peripheral wall 230a so as to hold the front face of the inflator 222 around the front face of the inflator 222.

The airbag-fitting member 228 is arranged so that the inflator 222 is inserted thereinto from the opening 228a, and the periphery of the opening 228a is positioned along the internal surface of the airbag 226 so as to hold the periphery of the opening 226a in the airbag 226. These airbag 226 and airbag-fitting member 228 are fixed to the retainer 224 with bolts and nuts, etc.

The inflator 222 is fixed to the retainer 224 by the capping portion 230 extending along a side of the inflator 222 and holding the front face of the inflator 222 around the front face thereof.

In the airbag apparatus 220, the inflator 222 can be securely fixed to the retainer 224 only by the capping portion 230 of the airbag-fitting member 228 in such a manner without providing an accommodating area in the retainer 224.

Figure 21A:
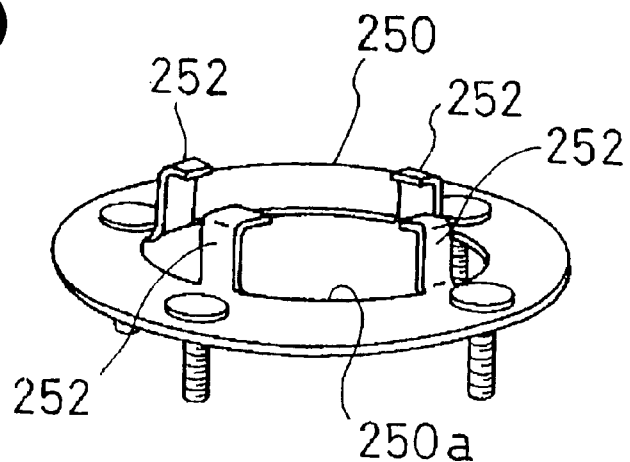
FIG. 21(a) is a perspective view of a modified example of the airbag-fitting member in the airbag apparatus according to the present invention.
Figure 21B:
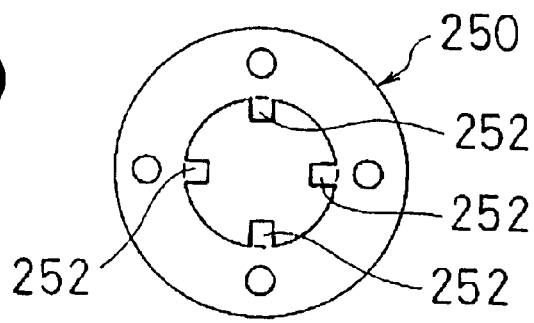
FIG. 21(b) is a plan view of FIG. 21(a)
Figure 21C:
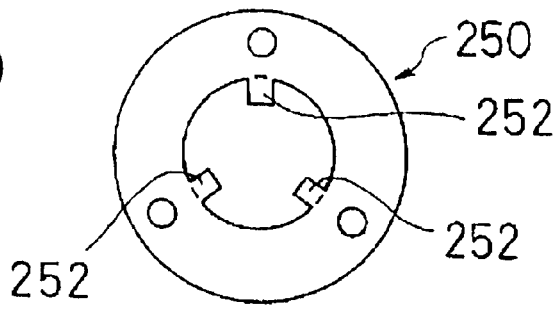
FIGS. 21(c) and 21(d) are plan views of modified examples.
Figure 21D:
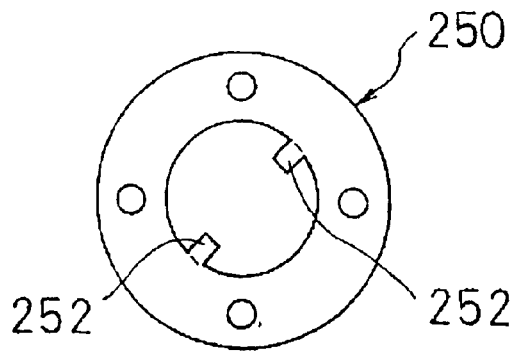
Figure 22A:
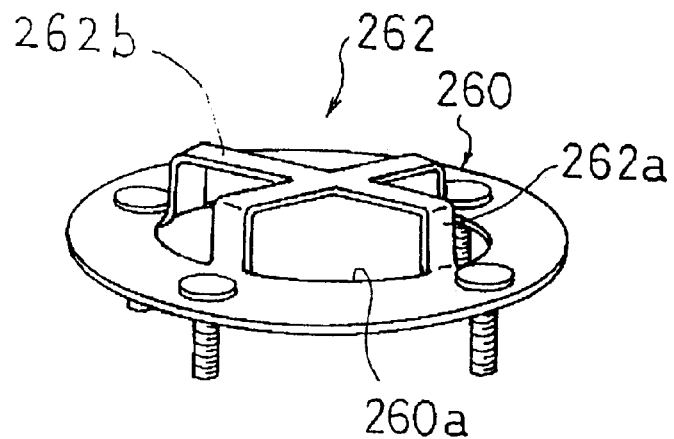
FIG. 22(a) is a perspective view of a modified example of the airbag-fitting member in the airbag apparatus according to the present invention.
Figure 22B:
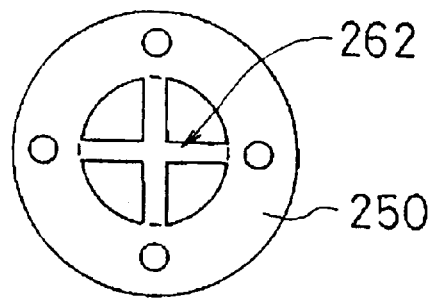
FIG. 22(b) is a plan view of FIG. 22(a)
Figure 22C:
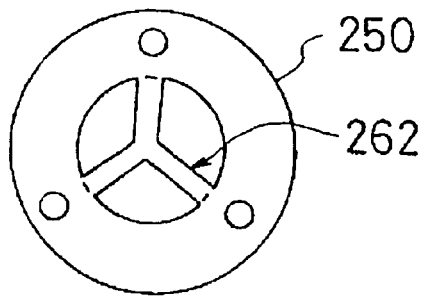
FIGS. 22(c) and 22(d) are plan views of modified examples.
Figure 22D:
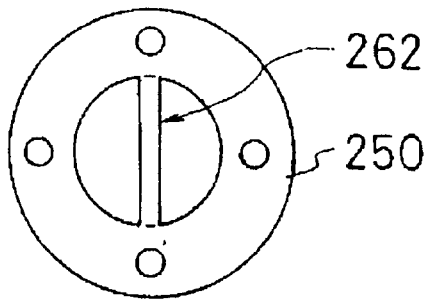

In addition, in the embodiments described above, the airbag-fitting member is provided with the capping portion for holding the front face of the inflator. The capping portion comprises the substantially cylindrical peripheral wall extending from the fringe of the opening for the inflator formed in the airbag-fitting member toward the front so as to extend along the side of the inflator, and the inward flange formed of the tip end of the peripheral wall around the front face of the inflator. However, the capping portion is not limited to this structure. Other structures of the capping portion will be described below with reference to FIG. 21(a) to FIG. 22(d). FIGS. 21(a) and 22(a) are perspective views of airbag-fitting members having capping portions; FIGS. 21(b) and 22(b) are top plan views of the airbag-fitting members shown in FIGS. 21(a) and 22(a); and FIGS. 21(c), 22(c), 21(d) and 22(d) are top plan views of the airbag-fitting members showing modified examples of the capping portion.

An airbag-fitting member 250 shown in FIG. 21(a) comprises an opening 250a for the inflator and capping portions 252 having a shape of a substantially inverted L-shaped hook to extend from the fringe of the opening 250a toward the front, the tip end thereof being bent so as to hold the front face of the inflator (not shown) around the front face of the inflator.

Plural capping portions 252 are formed along the opening 250a at equal intervals. For example, in FIGS. 21(a) and 21(b), the airbag-fitting member 250 has four capping portions 252 disposed at positions dividing the opening 250a into four equal parts. Also, in FIGS. 21(c) and 21(d), the respective airbag-fitting members 250 have three and two capping portions 252 disposed at positions dividing the opening 250a into three and two equal parts, respectively.

An airbag-fitting member 260 shown in FIG. 22(a) comprises an opening 260a for the inflator which comprises a capping portion 262 in its periphery including plural legs 262a extending from the fringe of the opening 260a toward the front and a bridging portion 262b connecting the tip ends of the legs 262a together and holding the front face of the inflator around the front face of the inflator.

The legs 262a of the capping portion 262 extend from positions dividing the opening 260a into equal parts, respectively. For example, in FIGS. 22(a) and 22(b), the airbag-fitting member 260 has four legs 262a extending from the fringe of the opening 260a and disposed at positions dividing the opening 260a into four equal parts. Also, in FIGS. 22(c) and 22(d), the respective airbag-fitting members 260 have three and two legs 262a extending from the fringe of the opening 260a and disposed at positions dividing the opening 260a into three and two equal parts, respectively.

The airbag-fitting members 250 and 260 formed as stated above can also fix the inflators securely to the retainers because the capping portions 252 and 262 hold the front faces of the inflators.

As described above in detail, in the airbag apparatus according to the present invention, since the inflator is fixed to the retainer with the airbag-fitting member, even when using the inflator without a fitting piece to the retainer, the inflator can be securely fixed to the retainer, thereby eliminating the process for arranging the fitting piece to the retainer for the inflator and reducing the cost as well.

Also, in an airbag apparatus according to the present invention, the switch is arranged between the front face of the inflator and the module cover, and the switch can be supported by the airbag-fitting member so that the operability of the switch can be improved. Furthermore, the airbag is formed to be restrained from inflating toward the front in the early stage of the inflation by the strap connecting the airbag-fitting member to the front face of the airbag, the module cover, or the emblem, so that the side of the airbag is largely inflated outside the steering wheel, thereby the airbag can lie between a driver and the steering wheel sufficiently.

While the invention has been explained with reference to the specific embodiments of the invention, the explanation is illustrative and the invention is limited only by the appended claims.

What is claimed is:

1. An airbag apparatus comprising:
    a base member including an inflator-reception area having an opening, a peripheral wall extending rearwardly around the opening and an inward flange disposed in a rear end of the peripheral wall to extend inwardly therefrom and form a center opening,
    an airbag situated above the base member,
    an airbag-fitting member disposed on the base member to attach the airbag between the airbag-fitting member and the base member and including a capping portion having an opening, a peripheral wall extending forwardly around the opening and an inward flange disposed in a front end of the peripheral wall to extend inwardly therefrom and form a center opening,
    an inflator for generating gas to inflate the airbag, said inflator having a smooth side face without a projection projecting outwardly from the side face of the inflator and being disposed in the openings of the inflator-reception area and the capping portion, said inflator being held between the inward flanges of the inflator-reception area and the capping portion and fixed to the base member by the airbag-fitting member, and
    a module cover for covering the airbag in a folded condition.

2. An airbag apparatus according to claim 1, wherein said airbag is arranged on a front face of the base member, said base member having an opening inside the inward flange, said airbag-fitting member having an opening inside the inward flange.

3. An airbag apparatus according to claim 2, wherein said accommodating area is formed integrally with the base member.

4. An airbag apparatus according to claim 2, wherein said accommodating area is formed separately from the base member and is fixed thereto.

5. An airbag apparatus according to claim 2, further comprising a first engaging portion formed on the inflator, and a second engaging portion engaging the first engaging portion formed on one of the airbag-fitting member and base member so that the inflator does not move when fixed.

6. An airbag apparatus according to claim 1, further comprising a strap for connecting the airbag fitting member to a front face of the airbag.

7. An airbag apparatus comprising:

a base member having an accommodating area, an airbag situated above and arranged on a front face of the base member, an airbag-fitting member disposed on the base member to attach the airbag to the base member and having a capping portion and a plurality of claws passing through the airbag and the base member so that when the claws passing through the airbag and the base member are bent, the airbag-fitting member is fixed to the base member, an inflator for generating gas to inflate the airbag, said inflator having a smooth side face without a projection projecting outwardly from the side face of the inflator and being accommodated at the accommodating area, said capping portion being located on a front face of the inflator to hold the inflator thereat so that the inflator is fixed to the base member by the capping portion of the airbag-fitting member, and a module cover for covering the airbag in a folded condition.

8. An airbag apparatus comprising:

a base member having an accommodating area, an airbag situated above and arranged on a front face of the base member, an airbag-fitting member disposed on the base member to attach the airbag to the base member and having a capping portion, an inflator for generating gas to inflate the airbag, said inflator having a smooth side face without a projection projecting outwardly from the side face of the inflator and being accommodated at the accommodating area, said capping portion being located on a front face of the inflator to hold the inflator thereat so that the inflator is fixed to the base member by the capping portion of the airbag-fitting member, a module cover for covering the airbag in a folded condition, and a switch disposed between the front face of the inflator and a front face of the module cover, said switch being supported by the capping portion of the airbag-fitting member.

9. An airbag apparatus comprising:

a base member, an airbag situated above the base member, an airbag-fitting member disposed on the base member to attach the airbag to the base member, an inflator for generating gas to inflate the airbag, said inflator having a smooth side face without a projection projecting outwardly from the side face of the inflator and being fixed to the base member by the airbag-fitting member, a module cover for covering the airbag in a folded condition, and an emblem and a strap, one of the module cover and the emblem being attached to a front face of the airbag and being connected to the airbag-fitting member by the strap.

* * * * *